US012695678B2

(12) United States Patent
Estevez et al.

(10) Patent No.: US 12,695,678 B2
(45) Date of Patent: Jul. 28, 2026

(54) METHOD AND APPARATUS FOR SUPPORTING FEDERATED LEARNING IN WIRELESS COMMUNICATION SYSTEM

(71) Applicant: SAMSUNG ELECTRONICS CO., LTD., Suwon-si (KR)

(72) Inventors: David Gutierrez Estevez, Staines (GB); Mahmoud Watfa, Staines (GB); Chadi Khirallah, Staines (GB); Dongeun Suh, Suwon-si (KR); Jungshin Park, Suwon-si (KR); Joan Pujol Roig, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/862,889

(22) PCT Filed: May 3, 2023

(86) PCT No.: PCT/KR2023/006071
§ 371 (c)(1),
(2) Date: Nov. 4, 2024

(87) PCT Pub. No.: WO2023/214806
PCT Pub. Date: Nov. 9, 2023

(65) Prior Publication Data
US 2025/0274351 A1    Aug. 28, 2025

(30) Foreign Application Priority Data

May 6, 2022    (GB) ...................................... 2206690
Aug. 10, 2022    (GB) ...................................... 2211702
(Continued)

(51) Int. Cl.
*H04L 41/16*        (2022.01)
*G06N 3/098*        (2023.01)
(Continued)

(52) U.S. Cl.
CPC ............. *H04L 41/16* (2013.01); *G06N 3/098* (2023.01); *H04L 41/0883* (2013.01);
(Continued)

(58) Field of Classification Search
CPC ..... H04L 41/16; H04L 41/0883; H04L 41/14; H04L 41/50; H04L 47/2475; H04L 67/14; H04L 67/146; G06N 3/098; H04W 48/16
See application file for complete search history.

(56) References Cited

U.S. PATENT DOCUMENTS

2021/0064996 A1    3/2021    Wang et al.
2021/0182658 A1    6/2021    Wang et al.
(Continued)

FOREIGN PATENT DOCUMENTS

WO        2021172810 A1    9/2021
WO        2022010685 A1    1/2022
WO        2023173321 A1    9/2023

OTHER PUBLICATIONS

Gutierrez Estevez, David, "full Table of Contents for TR 23.700-80 Word version: 18.0.0", Dec. 2022, https://www.tech-invite.com/3m23/tinv-3gpp-23-700-80.html (Year: 2022).*
(Continued)

*Primary Examiner* — Ramy M Osman

(57) ABSTRACT

The disclosure relates to a 5G or 6G communication system for supporting a higher data transmission rate. A method for supporting federated learning (FL) by an application federated learning support function (AFLSF) in a wireless communication system is provided. The method comprises receiving, from an application function (AF), a message for requesting assistance for an FL operation: obtaining, from a network data analytics function (NWDAF), analytics to get assistance on determination of an FL configuration recommendation; obtaining information related to at least one user equipment (UE) from a session management function (SMF)
(Continued)

and an access and mobility management function (AMF); deriving a FL configuration recommendation based on the analytics and the obtained information related to the at least one UE; transmitting, to the AF, a response message including at least one parameter related to the FL configuration recommendation.

20 Claims, 10 Drawing Sheets

(30) Foreign Application Priority Data

| | | |
|---|---|---|
| Jan. 16, 2023 | (GB) | ..................................... 2300612 |
| Apr. 27, 2023 | (GB) | ..................................... 2306267 |

(51) Int. Cl.

| | |
|---|---|
| H04L 41/08 | (2022.01) |
| H04L 41/14 | (2022.01) |
| H04L 41/50 | (2022.01) |
| H04L 47/2475 | (2022.01) |
| H04L 67/14 | (2022.01) |
| H04W 48/16 | (2009.01) |
| H04L 67/146 | (2022.01) |

(52) U.S. Cl.

CPC .............. *H04L 41/14* (2013.01); *H04L 41/50* (2013.01); *H04L 47/2475* (2013.01); *H04L 67/14* (2013.01); *H04W 48/16* (2013.01); *H04L 67/146* (2013.01)

(56) References Cited

U.S. PATENT DOCUMENTS

| | | | |
|---|---|---|---|
| 2021/0406677 A1 | 12/2021 | Wang et al. | |
| 2022/0108214 A1 | 4/2022 | Lee et al. | |
| 2022/0150057 A1* | 5/2022 | Yang | ................... H04L 63/0823 |
| 2023/0090022 A1 | 3/2023 | Han et al. | |
| 2023/0145177 A1* | 5/2023 | Wang | ................... H04L 41/145 |
| | | | 706/10 |
| 2023/0259812 A1* | 8/2023 | Jagyasi | .................. G06N 3/098 |
| | | | 706/13 |
| 2023/0370525 A1* | 11/2023 | Khare | ..................... H04W 8/18 |
| 2024/0028961 A1* | 1/2024 | Ali | ........................ H04L 41/145 |
| 2024/0333604 A1* | 10/2024 | Zhu | ......................... H04W 8/22 |
| 2025/0023785 A1* | 1/2025 | Cheng | ................. H04L 41/0893 |
| 2025/0023800 A1* | 1/2025 | Cheng | .................. H04B 17/318 |
| 2025/0274350 A1* | 8/2025 | Kim | ...................... H04L 67/535 |
| 2025/0274351 A1* | 8/2025 | Estevez | ................... H04L 41/14 |
| 2026/0012397 A1* | 1/2026 | Kim | ....................... G06N 20/00 |

OTHER PUBLICATIONS

Nvidia, "Federated learning background and architecture", Feb. 2, 2023, https://docs.nvidia.com/clara/clara-train-archive/3.1/federated-learning/fl_background_and_arch.html# (Year: 2023).*

International Search Report and Written Opinion of the International Searching Authority dated Aug. 1, 2023, in connection with International Application No. PCT/KR2023/006071, 8 pages.

3GPP TR 23.700-80 V0.2.0 (Apr. 2022) Technical Report, 3rd Generation Partnership Project; Technical Specification Group Services and System Aspects; Study on 5G System Support for AI/ML-based Services (Release 18), Apr. 2022, 93 pages.

3GPP TS 22.261 V18.6.0 (Mar. 2022) Technical Specification, 3rd Generation Partnership Project; Technical Specification Group Services and System Aspects; Service requirements for the 5G system; Stage 1 (Release 18), Mar. 2022, 114 pages.

3GPP TS 23.502 V17.4.0 (Mar. 2022) Technical Specification, 3rd Generation Partnership Project; Technical Specification Group Services and System Aspects; Procedures for the 5G System (5GS); Stage 2 (Release 17), Mar. 2022, 738 pages.

Yu et al., "Polynomial Codes: an Optimal Design for High-Dimensional Coded Matrix Multiplication," 3 1st Conference on Neural Information Processing Systems (NIPS 2017), Long Beach, CA, USA, 11 pages.

Dutta et al., "Slow and Stale Gradients Can Win the Race: Error-Runtime Trade-offs in Distributed SGD," Proceedings of the 21st International Conference on Artificial Intelligence and Statistics (AISTATS) 2018, Lanzarote, Spain, 10 pages.

Examination Report under Section 18(3) dated Jul. 18, 2024, in connection with United Kingdom Patent Application No. GB2306267. 2, 7 pages.

Combined Search and Examination Report under Sections 17 and 18(3) dated Oct. 30, 2023, in connection with United Kingdom Patent Application No. GB2306267.2, 7 pages.

Supplementary European Search Report dated Jul. 4, 2025, in connection with European Patent Application No. 23799687.1, 10 pages.

* cited by examiner

[Fig. 1]
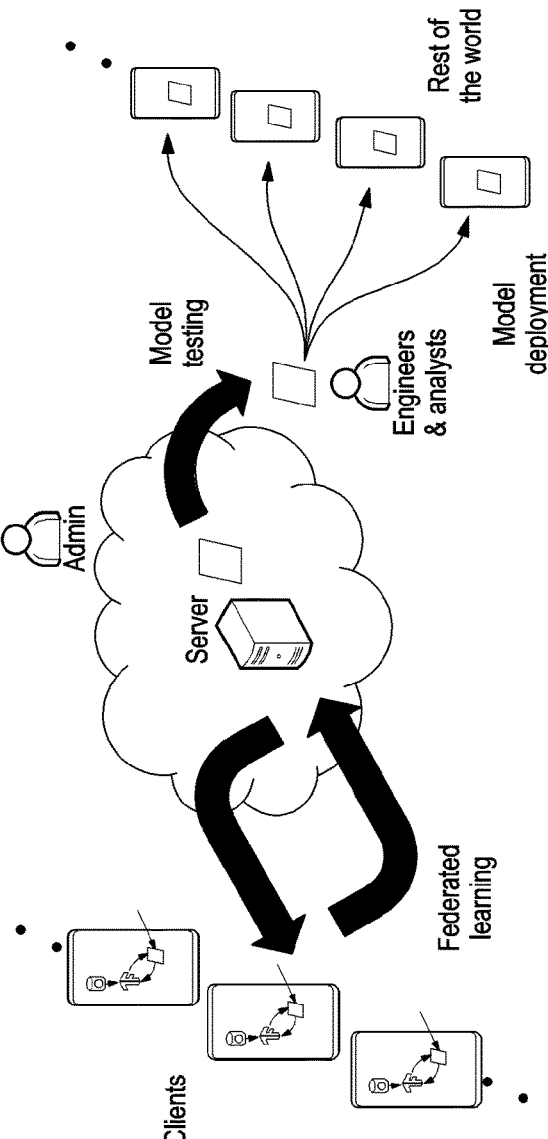
[Fig. 2]
Classical FL
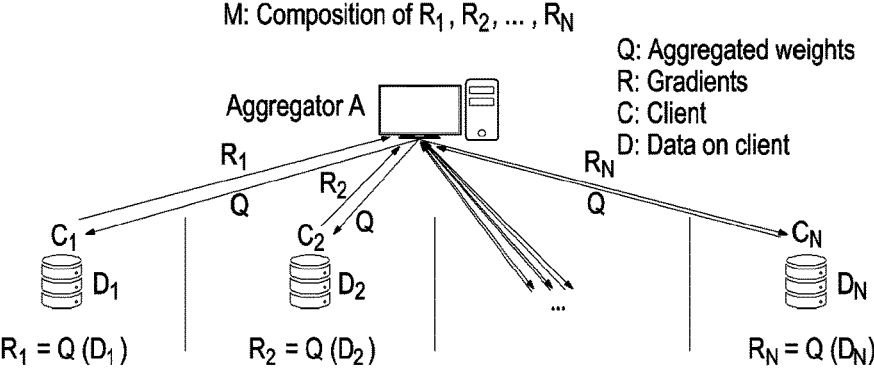

[Fig. 3]
FL with stragglers
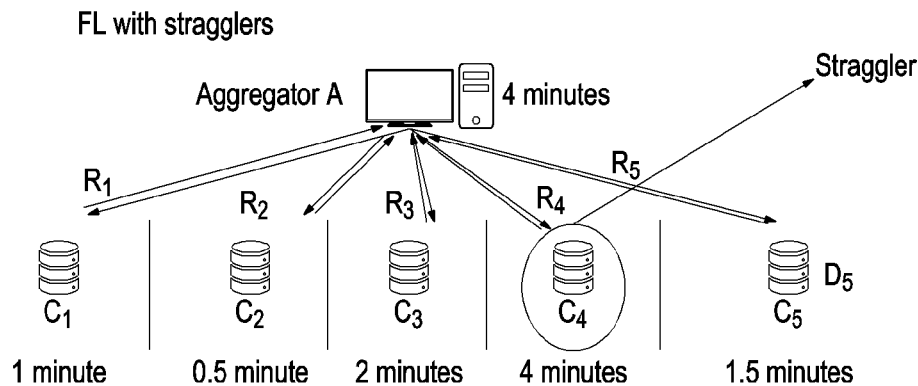
[Fig. 4]
Asynchronous FL vs Synchronous FL
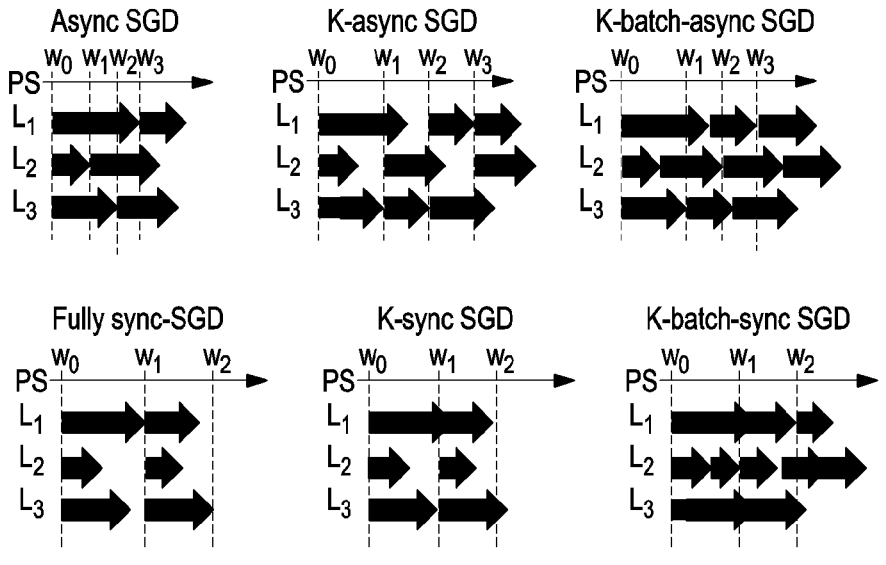

[Fig. 5]
Asynchronous FL vs Synchronous FL
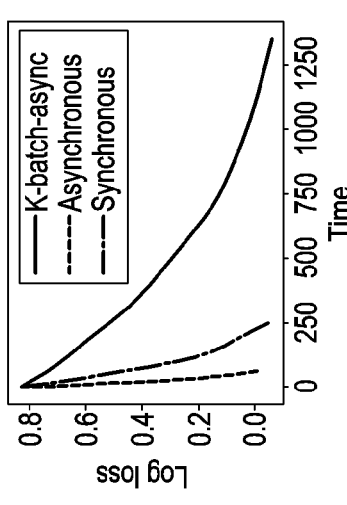
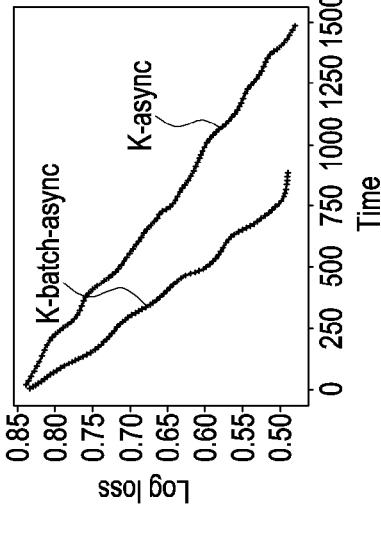
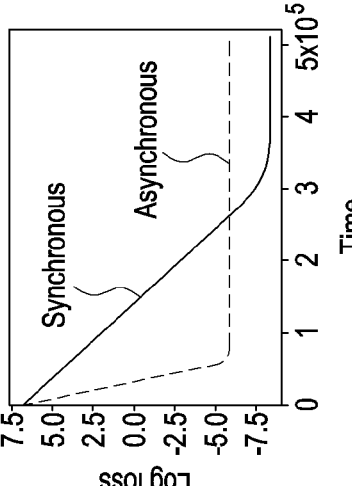

[Fig. 6]
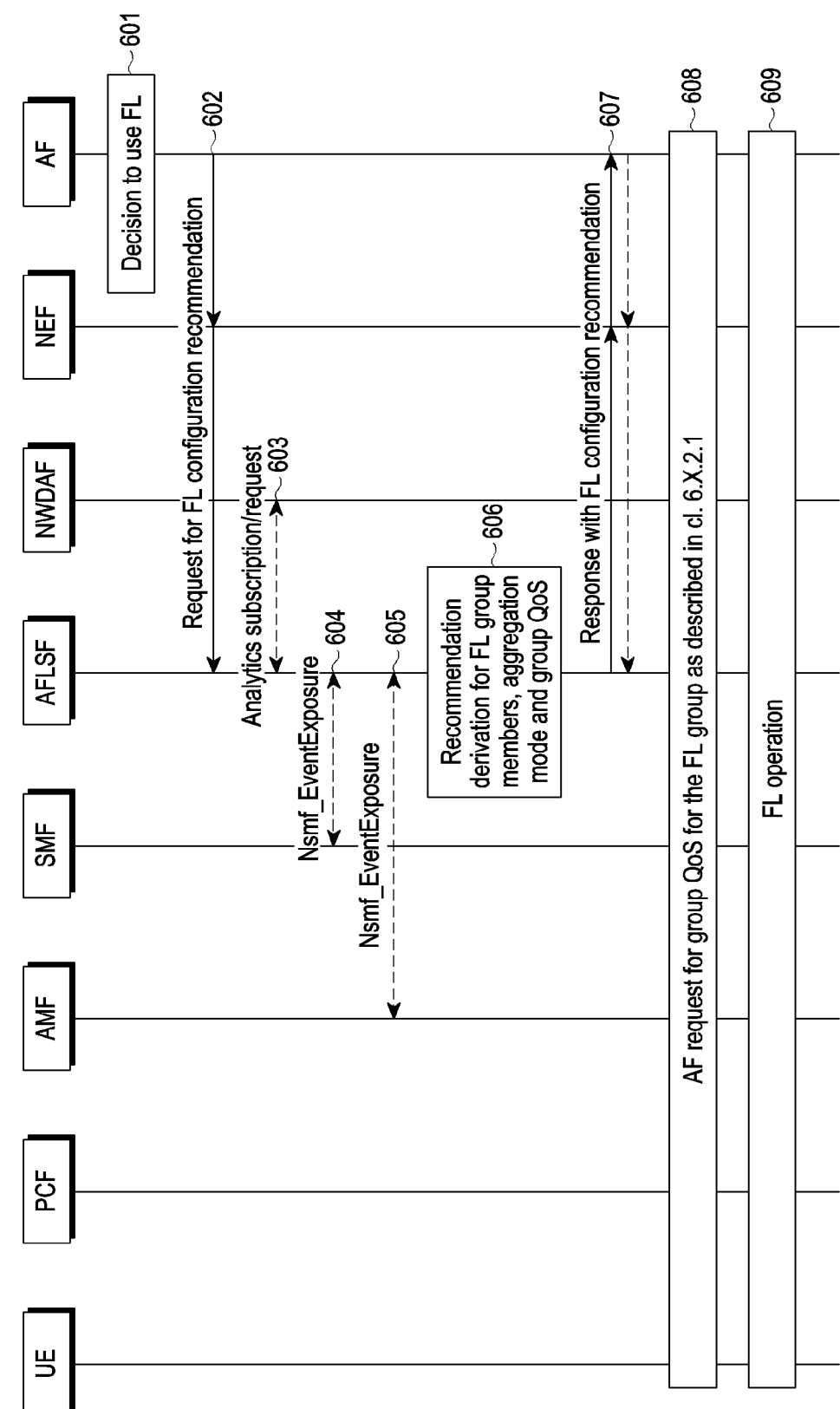

[Fig. 7]
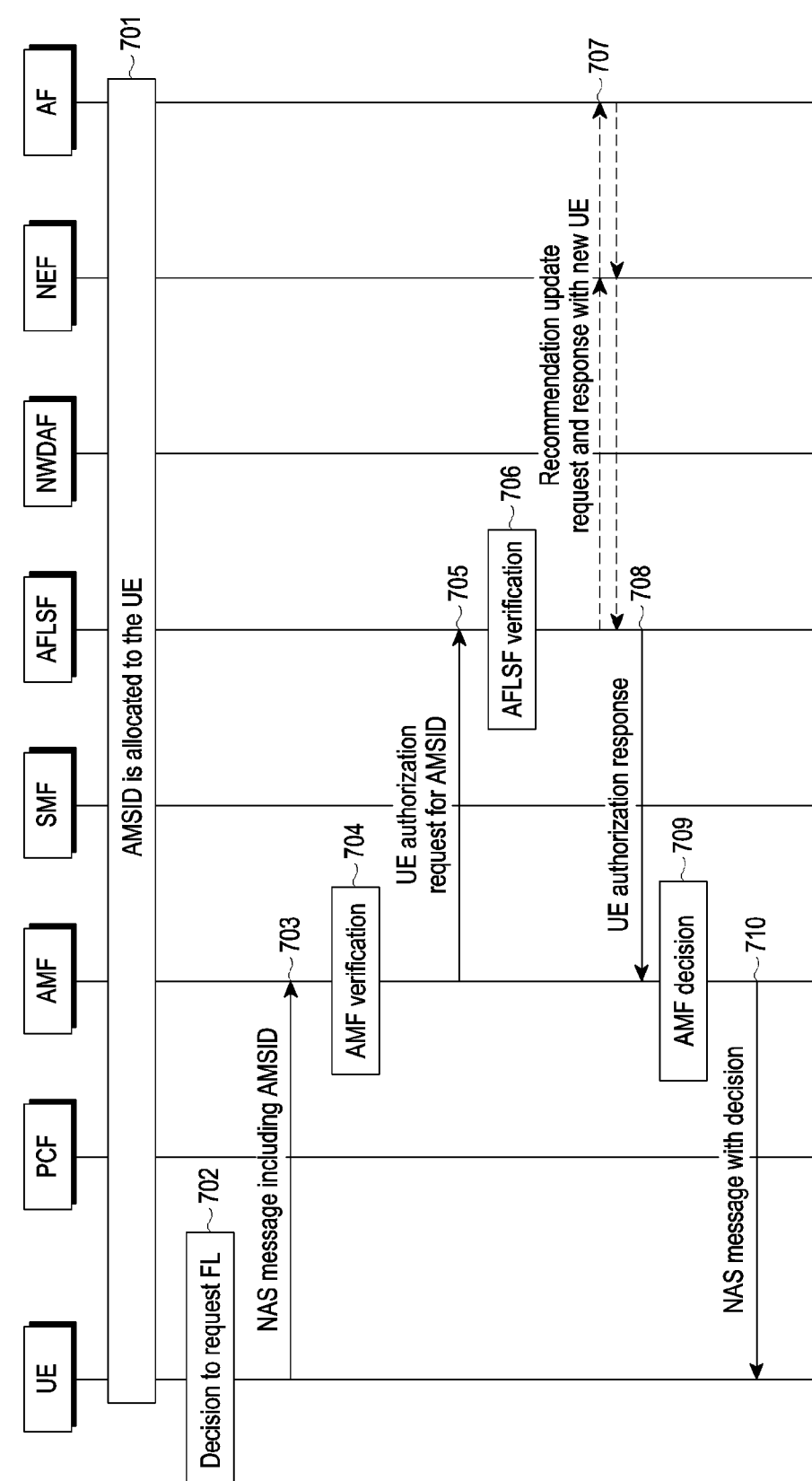

[Fig. 8]
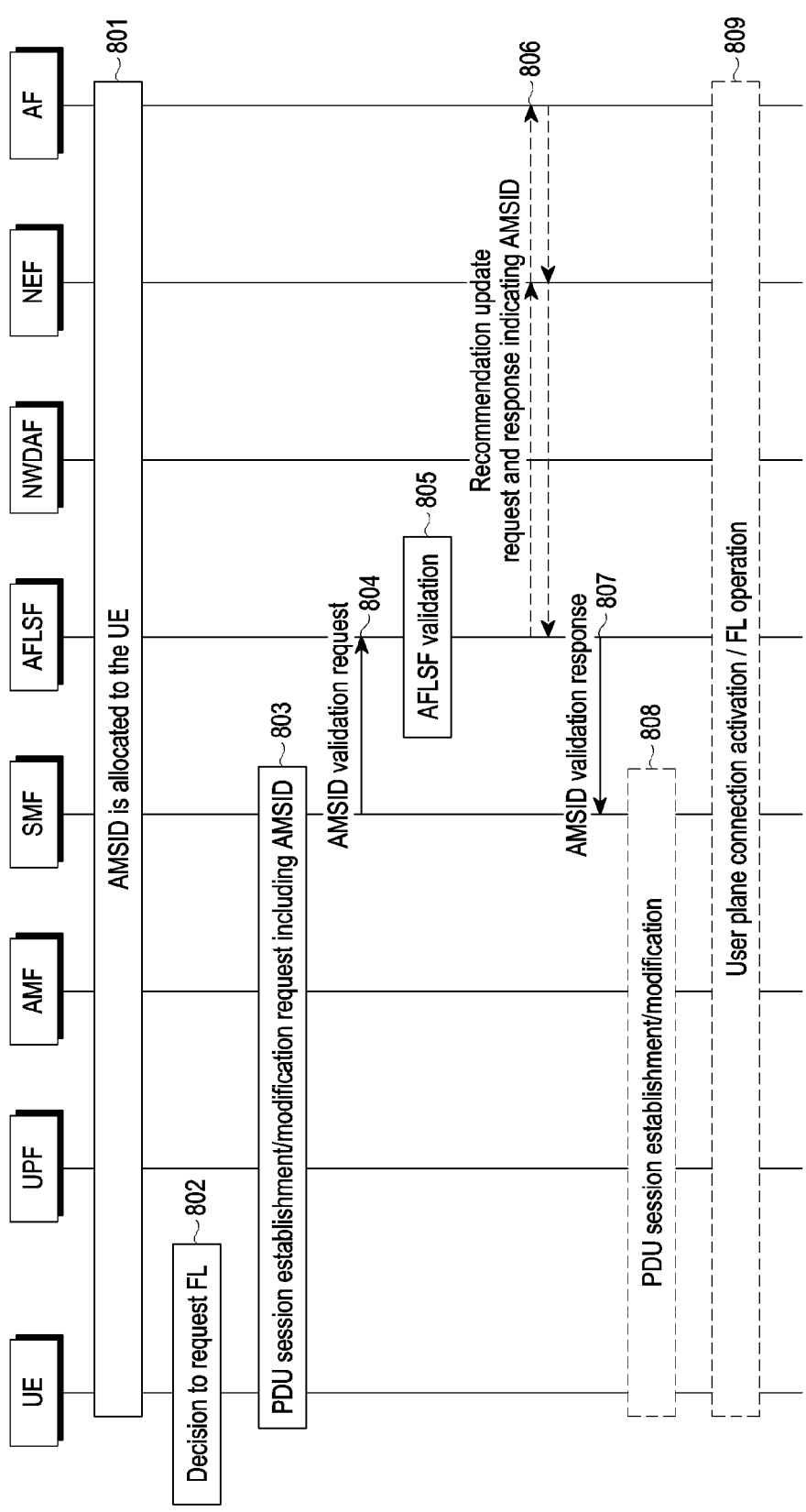

[Fig. 9]
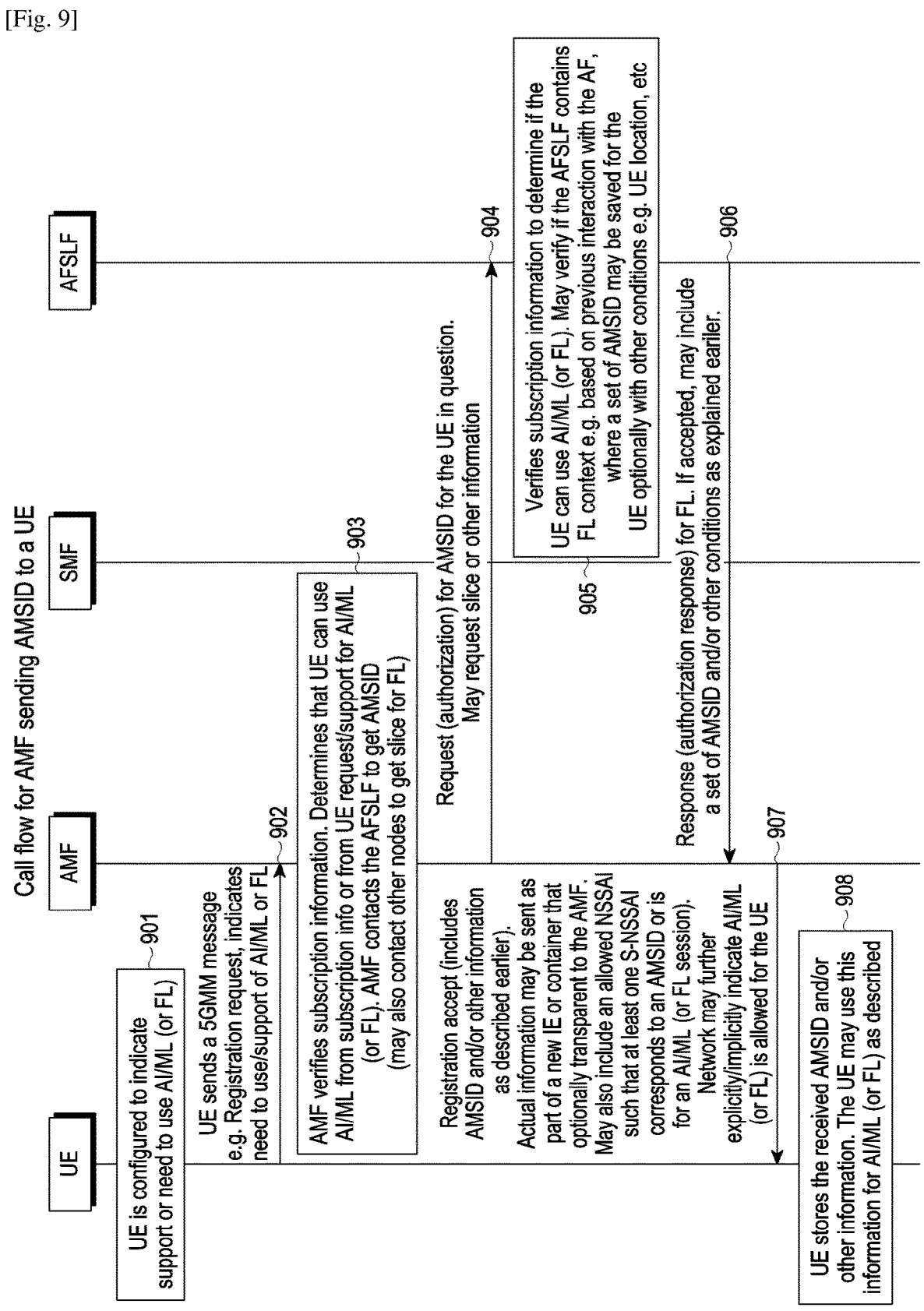

[Fig. 10]
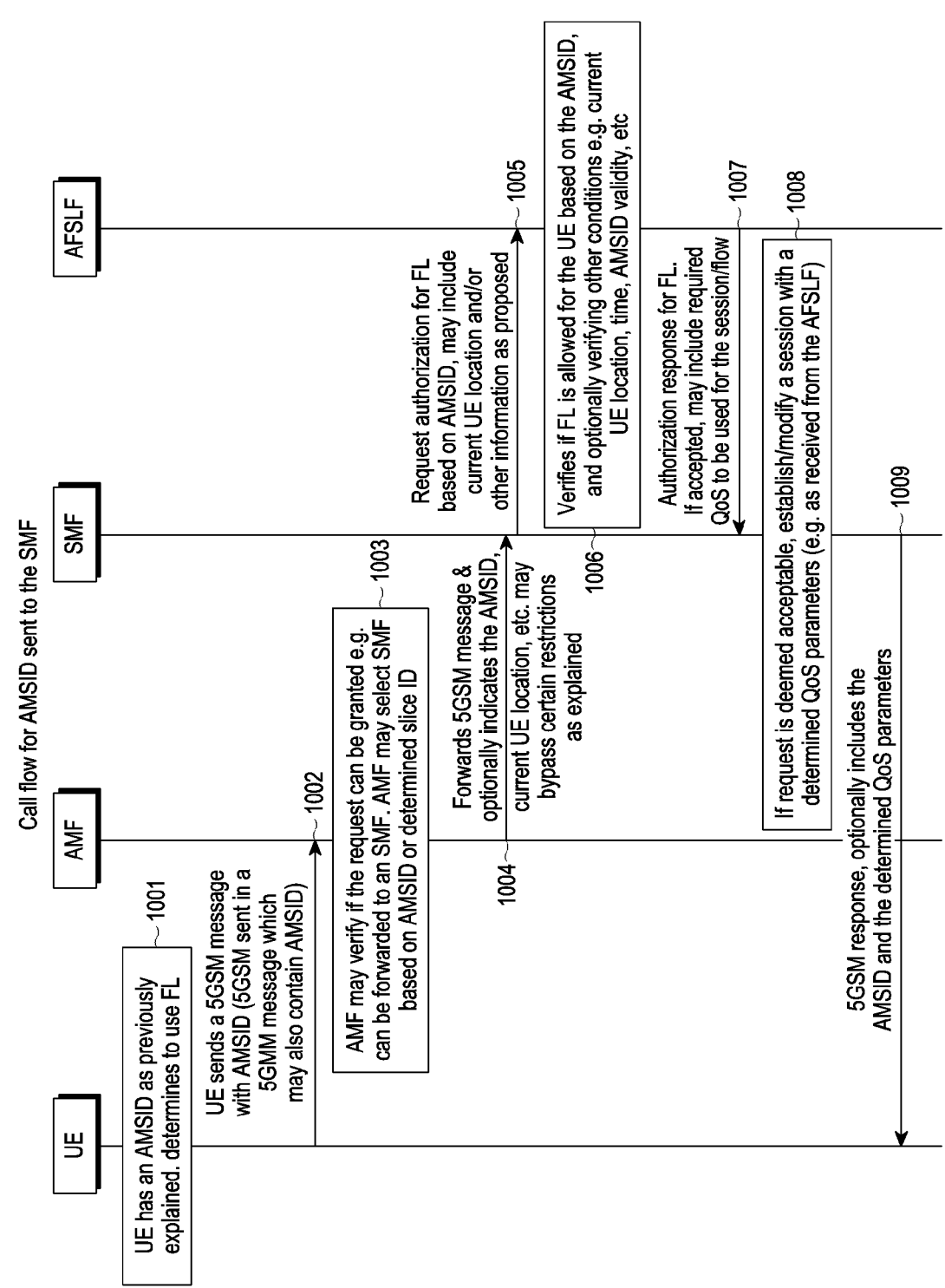

[Fig. 11]
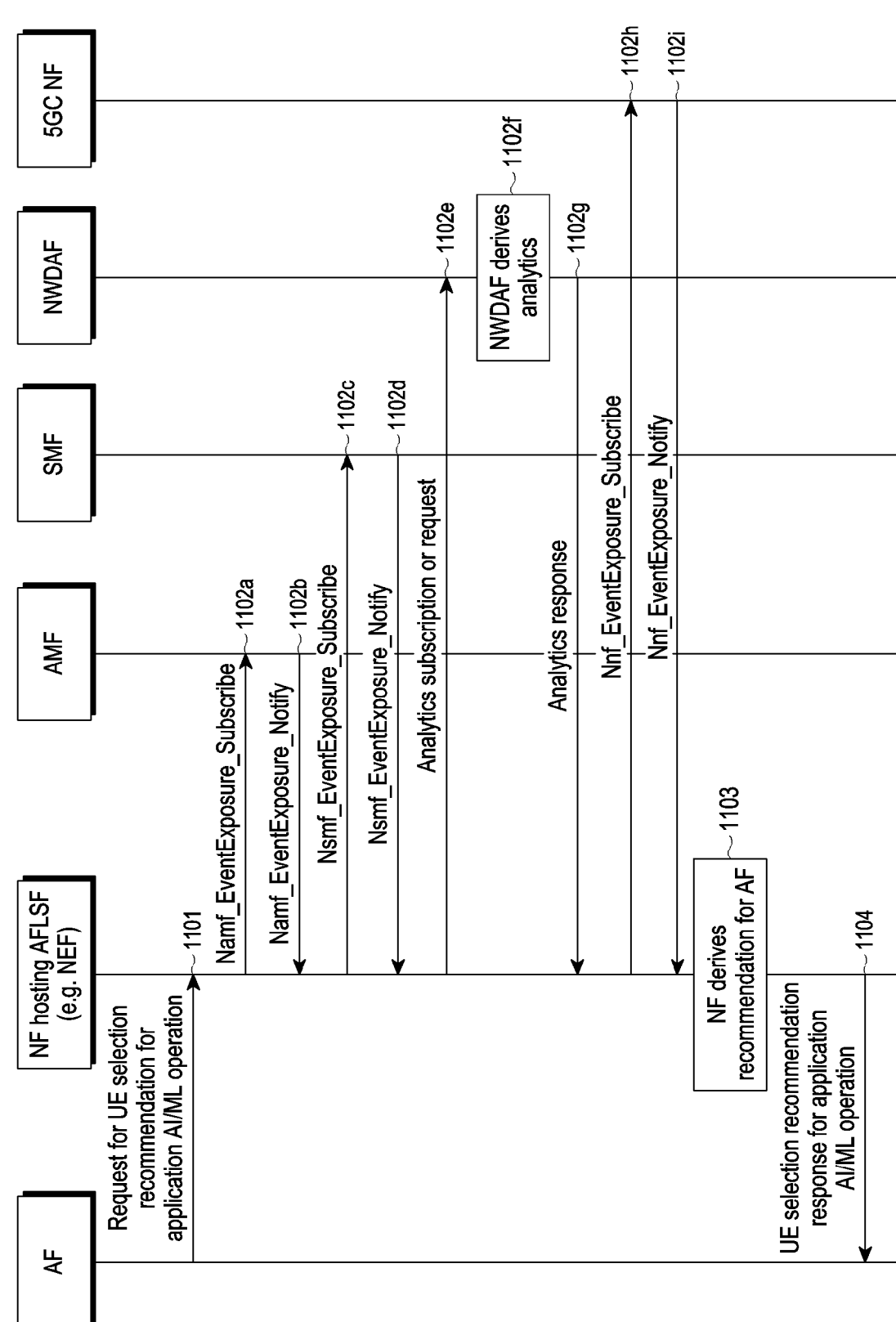

[Fig. 12]
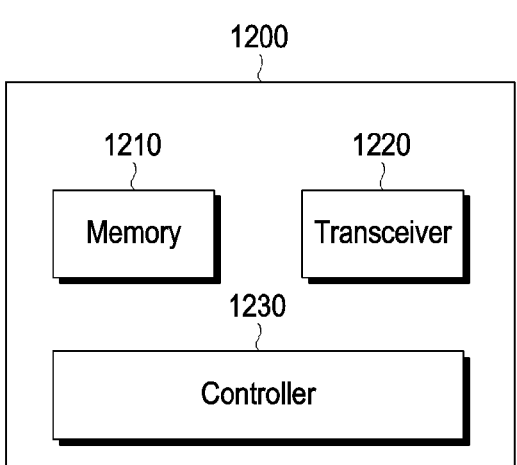

METHOD AND APPARATUS FOR SUPPORTING FEDERATED LEARNING IN WIRELESS COMMUNICATION SYSTEM

CROSS-REFERENCE TO RELATED APPLICATIONS

This application is a U.S. National Phase Entry of PCT International Application No. PCT/KR2023/006071, which was filed on May 3, 2023, and claims priority to UK Patent Application No. 2206690.6 filed on May 6, 2022, UK Patent Application No. 2211702.2 filed on Aug. 10, 2022, UK Patent Application No. 2300612.5 filed on Jan. 16, 2023, and UK Patent Application No. 2306267.2 filed on Apr. 27, 2023 in the UK Patent Office, the entire disclosure of which is incorporated herein by reference.

TECHNICAL FIELD

The present disclosure relates to a method and an apparatus for supporting federated learning operation in a wireless communication system.

BACKGROUND ART

5th generation (5G) mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Artificial Intelligence/Machine Learning (AI/ML) is being used in a range of application domains across industry sectors. In mobile communications systems, conventional algorithms (e.g. speech recognition, image recognition, video processing) in mobile devices (e.g. smartphones, automotive, robots) are being increasingly replaced with AI/ML models to enable various applications.

The 5G system can support various types of AI/ML operations, in including the following three:

AI/ML operation splitting between AI/ML endpoints

AI/ML model/data distribution and sharing over 5G system

Distributed/Federated Learning over 5G system

Federated learning (FL) is learning in distributed data environments. Referring to FIG. 1, in a federated learning system, multiple client data sources collaborate to learn a predictive model. Limited trust is likely to exist between the clients, as clients do not want other participants to learn their private data in the learning process. In FL, there may be limited communication between clients and data/resource heterogeneity. The data heterogeneity arises as some clients will have more data than others. Resource heterogeneity arises as some clients may have less computation/connectivity resource than others. Clients can also drop out during the learning process.

Referring to FIG. 2 classical FL, using a centralised learning system, is shown. Each of the clients $C_1$ to $C_x$ receives aggregated weights for a model from the aggregator A, uses the weights with their data $D_1$ to $D_x$ to produce result gradients $R_1$ to $R_N$ and passes these back to the aggregator A. The aggregator A combines the result gradients to produce a composition M. In the learning process, the data local to each client remains with the client and is not passed to the aggregator A. In this way, privacy and security of the data can be addressed. Referring to FIG. 3, a similar learning process is shown with added time parameters. It can be seen that the result gradient $R_4$ of client $C_4$ is received later than the result gradients from the other clients, and this result, $R_4$, is referred to as a straggler.

Referring to FIG. 4, asynchronous FL versus synchronous FL is described. In synchronous FL, a synchronous stochastic gradient descent (SGD) technique is used, in which the aggregator server waits for all clients, or learners, to push result gradients to it, before it updates parameters of the model being learnt. In these circumstances, random delays in computation (referred to as straggling) are common in today's distributed systems. To alleviate the problem of stragglers, the SGD technique can be run in an asynchronous manner, where the central model parameters at the aggregator server are updated without waiting for all client learners to push their gradients. FIG. 5 shows the performance of asynchronous FL versus synchronous FL.

The current study in the 3rd Generation Partnership Project (3GPP) SA2 has not addressed all the possible engagement models that UEs can follow to participate in FL. Most solutions focus on the Application Function (AF) communicating with the 5G core (5GC) using a Network Exposure Function (NEF) to set up connections with particular quality of service (QoS) treatment, so that FL models or training data can be sent to the UEs. As such it can be observed that most of these solutions follow a sort of network initiated procedure for FL.

Different levels of interactions are expected between UE and AF as AI/ML endpoints, for example based on 3GPP TS 22.261 V18.5.0, to exchange AI/ML models, intermediate data, local training data, inference results and/or model performance as Application AI/ML traffic.

However support for application federated learning over 5G system (5GS), between AI/ML endpoints (e.g. UE and AF) as described above is not currently defined in the existing 5GC support mechanisms for applications.

There are other possible engagement models which do not conform to these solutions. Such engagement models have not been addressed. For example, methods can be proposed by which the UEs initiate connections for FL, in a way that only some authorized UEs may do so. The details of this engagement model and solutions are proposed herein.

The above information is presented as background information only to assist with an understanding of the present disclosure. No determination has been made, and no assertion is made, as to whether any of the above might be applicable as prior art with respect to the present invention.

DISCLOSURE OF INVENTION

Solution to Problem

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

According to an aspect of the present disclosure, a method for supporting federated learning (FL) by an application federated learning support function (AFLSF) in a wireless communication system is provided. The method may comprise receiving, from an application function (AF), a message for requesting assistance for an FL operation; obtaining, from a network data analytics function (NWDAF), analytics to get assistance on determination of an FL configuration recommendation; obtaining information related to at least one user equipment (UE) from a session management function (SMF) and an access and mobility management function (AMF); deriving a FL configuration recommendation based on the analytics and the obtained information related to the at least one UE; and transmitting, to the AF, a response message including at least one parameter related to the FL configuration recommendation.

According to an aspect of the present disclosure, an apparatus of an application federated learning support function (AFLSF) for supporting federated learning (FL) in a wireless communication system is provided. The apparatus may comprise a transceiver; and a controller coupled to the transceiver. The controller may be configured to receive, from an application function (AF), a message for requesting assistance for an FL operation; obtain, from a network data analytics function (NWDAF), analytics to get assistance on determination of an FL configuration recommendation; obtain information related to at least one user equipment (UE) from a session management function (SMF) and an access and mobility management function (AMF); deriving a FL configuration recommendation based on the analytics and the obtained information related to the at least one UE; and transmit, to the AF, a response message including at least one parameter related to the FL configuration recommendation.

According to an aspect of the present disclosure, a non-transitory computer readable storage medium storing instructions, which, executed by a controller of an apparatus of an application federated learning support function (AFLSF), causes the apparatus to perform operations. The operations may comprise receiving, from an application function (AF), a message for requesting assistance for an FL operation; obtaining, from a network data analytics function (NWDAF), analytics to get assistance on determination of an FL configuration recommendation; obtaining information related to at least one user equipment (UE) from a session management function (SMF) and an access and mobility management function (AMF); deriving a FL configuration recommendation based on the analytics and the obtained information related to the at least one UE; and transmitting, to the AF, a response message including at least one parameter related to the FL configuration recommendation Aspects, advantages, and salient features of the invention will become apparent to those skilled in the art from the following detailed description taken in conjunction with the accompanying drawings.

BRIEF DESCRIPTION OF DRAWINGS

FIG. 1 illustrates a prior art schematic representation of a federated learning (FL) system;

FIG. 2 illustrates a prior art schematic representation of a classical FL system;

FIG. 3 illustrates a prior art schematic representation of a classical FL system, with added time parameters;

FIG. 4 illustrates a prior art schematic representation of asynchronous FL versus synchronous FL;

FIG. 5 shows the performance of asynchronous FL versus synchronous FL;

FIG. 6 illustrates a schematic representation of a procedure for enabling FL configuration recommendation by the AFLSF;

FIG. 7 illustrates a schematic representation of a call flow for an AMF sending an AMSID to a UE;

FIG. 8 illustrates a schematic representation of a call flow for an AMSID sent to a SMF;

FIG. 9 shows a call flow for an AMF sending an AMSID to a UE;

FIG. 10 shows a call flow for an AMSID sent to a SMF; and

FIG. 11 shows a call flow of an exemplary procedure for enabling FL configuration recommendation by the NF hosting the AFLSF entity.

FIG. 12 shows a block DIAGRAM OF AN APPARATUS FOR AN ENTITY.

MODE FOR THE INVENTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made.

The following examples are applicable to, and use terminology associated with, 3GPP 5G. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network.

Application Federated Learning Flexible Operation in 5GS via an Application Federated Learning Support Function (AFLSF), for example, hosted at a dedicated or existing 5GC network function (NF) is described.

The FL operation of an AI/ML-based application over 5GS encounters and suffers from rigidity constraints when all user equipments (UEs) are expected to provide their updated models within strict delay boundaries for the application server to update and distribute a global model being learnt.

The communication network comprises a core and a plurality of user equipments (UEs) in which the core provides an entity comprising an Application Federated Learning Support Function (AFLSF), for example, that enables the provisioning of assistance to at least some of the member UEs to be selected to engage in federated learning (FL) via any of a synchronous FL mode, an asynchronous FL mode, an intermediate FL mode and to request joining of an existing FL session.

The AFLSF entity, for example, at a dedicated or existing 5GC NF, allows more flexible FL operation, for example by virtue of one or both of the following functional enablers:

i. enabling the assistance to the selection of UEs and to let them engage in FL via both a fully synchronous mode of model aggregation, where the application server needs to wait for all local updates before the aggregation takes place, and a fully asynchronous mode of model aggregation, where the application server can aggregate models without needing to wait for any specific individual model. In addition, intermediate modes are possible, which can also be known as hybrid modes. For example, the application server would wait for a selected group of UEs sharing a set of local models/model updates, but not wait for other UEs sharing their models/model updates before the aggregation of models (or model updates) into a global model.

ii. enabling the UEs to request joining of an already existing FL group/session may be used as part of an asynchronous FL aggregation mode, where the UEs may provide their model updates if/when they decide to do so and the network authorizes it.

This flexibility is important since the existence of stragglers is inevitable due to device heterogeneity and network unreliability. Asynchronous federated learning methods are well-known techniques in the federated learning literature addressing this problem, so the 5GS should be enabled to support these different aggregation modes by the application server. In addition, the FS_AIMLsys study has not addressed the different engagement models that UEs can follow to participate in Federated Learning, e.g. most solutions focus on the Application Function (AF) communicating with the 5GC using a Network Exposure Function (NEF) to set up connections with particular QoS treatment so that FL models or training data can be sent to the UEs. As such, it can be observed that most of these solutions follow a network-initiated model for FL. However, there are other possible engagement models key to supporting the aggregation mode flexibility advocated above which do not conform to these solutions. Such engagement models have not been addressed yet.

The AFLSF entity may allow at least some of the UEs to initiate connections for the FL. Only some of the UEs may be authorized UEs which initiate connections for the FL. The details of this engagement model and solutions are proposed below.

The AFLSF entity may be a 5GC entity. The AFLSF entity may support flexible application AI/ML operations (e.g. federated learning operations).

The AFLSF entity may be a NF. The AFLSF entity effectively means the 5GC is aware that an application FL operation is taking place, and that an AF is requesting 5GC assistance for the application FL operation.

A set of UEs may be selected for the FL, where the selected UEs may or may not be part of any particular group per se. The selection of the UEs for the FL is assumed to be the responsibility of the application layer, where an AF may carry out the selection based on any criteria such as: location of UEs, reachability/availability of UEs, user/UE consent, etc. In certain examples, the functionality at the 5GC can provide assistance to the AF for it to select the right UEs.

Aspects of the invention focus on the enablement of UE initiated procedures for engaging in FL. However, the AFLSF entity can apply to network initiated procedures where necessary. The description of the present disclosure will use "a UE" as an example for demonstration. However, the present disclosure can apply to a set of UEs which are performing FL. All proposals for any entity (or for all entities) may be applied in any order and in any combination.

Two aspects of an application FL operation are critical:

UEs that participate in the FL group at every stage of the process (static, semistatic, dynamic), and model aggregation paradigm for participating UEs: synchronous (UE models are received at a server within strict delay boundaries), asynchronous (UE models received at the server without delay boundaries), etc.

In the introduction of the AFLSF for a flexible FL operation, the AFLSF entity may be any of a standalone entity, an entity co-located with another 5GC entity, or an entity in an AF.

The AFLSF entity may have required functionality to inform, recommend and/or select an application FL aggregation mode and configure its operation. The application FL aggregation mode may determine the level of coordination required for sharing and/or aggregation of UE models that reach a central server of the AFLSF entity system. Aggregation will happen at an application server, but when one or more UEs share their model may depend on the FL aggregation mode.

The selection of the FL aggregation mode should be done in accordance with 5GS state. Similarly to UE selection, the selection of the FL aggregation mode may be an application layer decision. 5GS relevant information (including analytics) and/or a recommendation of the FL aggregation mode should be provided by the 5GS.

Main FL aggregation modes may include i) a fully synchronous mode (UEs know exactly when they should share their models as instructed by an application server and/or 5GS), ii) a fully asynchronous mode (UEs 'unilaterally' decide when to share their models), iii) other intermediate levels of coordination (e.g. K-(a)sync, K-batch-(a)sync, etc.).

In addition, one or more of the following features are proposed to leverage the AFLSF entity in providing further flexibility to the FL operation:

group QoS requirements and recommendations for the selected FL aggregation mode, e.g. a synchronous mode level X→QoS xx, an asynchronous mode level Y (e.g. 20% straggling UEs expected)→QoS yy, the introduction and configuration of an FL AIML session to support further flexibility in the FL operation:

an authorized UE may initiate a request to join a FL AIML session used by a FL group, this feature may allow a more flexible FL operation where UEs may join or leave a UE group dynamically, in asynchronous mode(s), a UE may stop contributing a trained model to the server (e.g. because of local overload or bad network conditions) and resume when conditions are again favorable.

A number of inputs and outputs may be defined that may be required to perform the FL aggregation mode recommendation and/or selection by the AFLSF entity. A large number of inputs may be useful to determine the optimal FL aggregation mode. Example inputs include one or more of the following:

packet delay measurements, UE communication analytics, traffic data volume, session inactivity timer, analytics.

Example outputs include one or more of the following:

recommendations for an AF for the FL aggregation mode: it may be a simple parameter (synchronous, asynchronous) or a more complex parameter to allow other synchronization variations, group QoS, AIML Session ID.

AFLSF Entity Service Operation Details

The AF is in charge of deciding the configuration of the application FL operation, but requests assistance from the 5GC AFLSF entity to determine the application FL operation configuration. The above services are used in the interactions of AF and the AFLSF entity to determine such configuration. The AF may make a configuration suggestion to the AFLSF entity and the AFLSF entity may respond to the request by accepting, modifying or denying such request from the AF.

The list of exchanged parameters aiding the application FL operation and their definition may be one or more of the following:

List/Group of UEs: external or internal ID of the UEs participating in the application FL operation. The same list/group can be provided for the complete FL operation, or a different list may be provided for each iteration of the FL operation.

Maximum number of learning iterations: the maximum iterations of model exchanges from the UEs to the application server and vice versa. The maximum number of iterations may not be reached if e.g. the training error criterion is met before the maximum number of iterations is reached.

Model aggregation time window (may also be known as data transfer synchronization window, or any wording variations thereof): maximum time that an application server can wait to receive local models from UEs to provide an update of the global model. If the time window is zero, then the application server operates in fully asynchronous mode.

Number of awaited models: number of local UE models the application server requires to receive within the model aggregation time window to provide an update of the global model.

Continuous training flag: flag indicating whether UEs are allowed to continue performing training once they have shared their local model and before they receive an update of the global model.

QoS requirements: QoS requirements being requested by the AF for the FL operation to meets its performance. The requirements may contain GBR, PER, MDBV, PDB, etc.

AI/ML session identifier (AMSID): identification of AI/ML session identifier to be used for the application FL operation.

Target area(s): area(s) where UEs should be located to be selected for FL operation.

Operation time validity: time during which the FL operation may be performed.

Examples of AFLSF Entity Services (For Example Hosted by a Dedicated NF or an Existing 5GC NF)

Service: Naflsf_FL_assistance

Service operations:

Naflsf_FL_assistance_request

Inputs, Required:

Inputs, Optional: list of UEs or group of UEs (optionally per iteration), event filters (e.g. maximum number of learning iterations, model aggregation time window, QoS requirements, AMSID, number of awaited models, continuous training flag, target area(s), operation time validity, target UE latency performance, expected UE behaviour parameters).

Outputs, Required: Operation execution result indication

Outputs, Optional: None

Inputs, Required:

Inputs, Optional: list of UEs or group of UEs (optionally per iteration), event filters (e.g. maximum number of learning iterations, model aggregation time window, QoS requirements, AMSID, number of awaited models, continuous training flag, target area(s), operation time validity, target UE latency performance, expected UE behaviour parameters).

Outputs, Required: Operation execution result indication

Outputs, Optional: None

Naflsf_FL_assitance_notify

Inputs, Required: Notification Correlation Information

Inputs, Optional: list of UEs or group of UEs (optionally per iteration), maximum number of learning iterations, model aggregation time window, QoS requirements, AMSID, number of awaited models, continuous training flag, target area(s), operation time validity, UE latency performance.

Outputs, Required: Operation execution result indication

Outputs, Optional: None

Naflsf_FL_assistance_unsubscribe

Inputs, Required: Subscription Correlation ID

Inputs, Optional: None

Outputs, Required: Operation execution result indication

Outputs, Optional: None

Event filter input parameters are used by the AFLSF entity as filters for UE selection, i.e. what type of criteria need to be met by the list of candidate UEs provided by the 5GC to the AF. In addition, once the request is received by the NF hosting the AFLSF entity (e.g. dedicated NF, NEF, etc.), the NF can collect data from other 5GC NFs to derive the list of candidate UEs to the AF. For example, data can be collected by the NF hosting the AFLSF entity from access and mobility management function (AMF), session management function (SMF) or policy control function (PCF) via event exposure, or network data analytics function (NWDAF) analytics can be collected by the NF hosting the AFLSF entity to derive the list of candidate UEs to the AF.

Furthermore, Expected UE Parameters as described in 3GPP TS 23.502 such as Expected UE Moving Trajectory, Communication Duration Time, Scheduled Communication Time, Expected Time and Day of Week in Trajectory, Expected Inactivity Time, etc. can be provided as event filters by the AF. They can be used by the NF hosting the AFLSF entity in multiple ways. For example, the NF hosting the AFLSF entity may check with unified data management (UDM) or AMF or SMF the list provided as event filter by the AF before making its recommendation. As another example, the NF hosting the AFLSF entity may check the confidence and/or accuracy levels of the expected UE parameters and use that information before making its recommendation to the AF.

Allocation of an AI/ML Session ID (AMSID) to a UE

A selected UE which is to engage in the FL may be provided with a new identity (ID) which represents an artificial intelligence (AI)/machine learning (ML) session identity or training identity, etc. This may be referred to as "AI/ML session ID" or "AI/ML training ID", etc. Hereafter, the "AI/ML session ID" (AMSID) will be used as an example of this new identity.

The AMSID may be provided either by the AF or another 5GC network function such as the AMF, SMF, or a new network function (NF) e.g. the AFLSF entity node. A UE performing FL may send the AMSID in a non-access stratum (NAS) message, which may be a 5G mobility management (5GMM) message, a 5G session management (5GSM) message or both.

A network node may verify if the AMSID is valid for use for FL. The verification may be performed against an existing FL UE context, which contains a set of valid AMSIDs, and/or against whether the UE is allowed to perform FL. Other conditions may also exist in the UE context, e.g. the location where FL is allowed to be performed by the UE, the time of the day, etc. This information may be available at the network either from the UDM (e.g. subscription) or from an interaction between the AF and the network, optionally via a network exposure function (NEF). The network determines if the UE is allowed to perform FL and, if so, the network grants the UE's request. The request may be a request to establish/modify a protocol data unit (PDU) session, or to set up user plane resources, etc. The network may apply specific QoS parameters for the UE's session as per information that is associated with the UE AMSID.

The AF may be responsible for allocation of the AMSID to a UE. The allocation may be performed via application layer signalling. This is out of scope of the 3GPP.

Alternatively, the AFLSF entity may be responsible or co-responsible for allocation of an AMSID to a UE. To achieve this, one or more of the following overall behaviour and/or actions are proposed:

the AF communicates with the 5GC to indicate which UE should be provided with the AMSID and where the UE may be identified using any current 3GPP internal and/or external identifier, the AF indicates which UE is selected to the AFLSF entity optionally via another network node, such as the PCF, NEF, UDM, AMF, SMF, etc., in addition to identifying which UE should be provided with an AMSID, the AF may also provide other conditions that need to be met before the UE is allowed to engage in FL, which may include any combination of the following, noting that other potential conditions may also be defined:

location of the UE where the FL is allowed, a network slice and/or deep neural network (DNN) that should be used with this AMSID, that should be used to connect for the purpose of FL, a time of the day, year, month, etc, at which the UE can/should connect to be part of a FL procedure, a duration and frequency of the FL operation, e.g. the UE should connect at a certain time T and can only continue to be part of a FL procedure after X units of time have elapsed. The AF may also provide indication of when a UE may or may not rejoin an ongoing FL training session after it does not provide a model update during a FL iteration, whether a certain number of UEs also need to be available at the same time (or at a separate/different designated time) for FL, where optionally the other UEs may be specific UEs or any other UEs that can perform FL or that share a certain requirement with the UE in question e.g. they have the same AMSID or they use the same application, etc., the AF may provide an application layer AMSID, where this AMSID is generated and allocated by the application layer (or AF) for the UE in question, subscription information may determine which UE or group of UEs is allowed to perform FL, and whether it may do so for one group only, or more than one group at any time, or whether there are other conditions such as those listed above, new subscription information may be defined for this purpose.

The uniqueness of the AMSID across the 5GS needs to be ensured. These may include one or more of the following:

Responsibility of the new NF node to ensure ID is unique while assigning it,

Session ID may be a combination of PLMN ID+AI/ML session ID, where the 'AI/ML session ID' needs to be unique, Other flavors can be possible such as including the AF ID also in the mix We can also have group ID in the mix Etc.

In general, uniqueness has to be a basic assumption for any entity that assigns it. Otherwise many IDs today in the 5GS (and EPS) would be subject to issues if such an assumption cannot be safely made.

Therefore, similarly to other IDs used across the 5GS, the uniqueness of the AMSID is ensured by the entity that allocates it, namely the AF or the 5GC entity, i.e. the AFLSF entity. If the AF is independently responsible for the AMSID allocation, then the mechanism to guarantee uniqueness is out of 3GPP scope. If the AFLSF entity (or any 5GC NF) is responsible for the allocation (on its own, or in coordination with the AF), then a potential way to guarantee the uniqueness of AMSID is by receiving an allocation proposal from the AF and/or using a combination of the PLMN ID plus the group ID referring to the participants in the FL operation. In addition, other identifiers may be used in the AMSID allocation such as AF ID, other AI/ML session identifiers, etc.

Once the AFLSF entity identifies a UE for the FL, the AFLSF entity may allocate at least one AMSID and save it in the UE context. The UE context may also contain any other conditions e.g. location of the UE, whether the AMSID allows the UE to engage in FL, time of the day, etc. The AMSID may be mapped to another form of AI/ML identity that the application layer may provide to the AFLSF as set out earlier.

The allocated AMSID may have a validity time which determines the period of time that the UE may be allowed to use the FL or to use the specific AMSID for the FL. The AFLSF entity (or the AF, if the AMSID is allocated by the AF) may start a timer (e.g. validity timer) that is associated with the AMSID. The AFLSF entity (or the AF) may allocate (and optionally send) a new AMSID (and/or conditions) after the expiry of the validity timer. The AFLSF entity (or the AF) may always allocate new AMSID information if the AMSID itself needs to change, e.g. if the allowed FL session is changed, or any of the listed conditions have changed. Once a new set of AMSID information is allocated, the related UE context is updated and the new information is sent to the UE.

The allocated AMSID may also have an associated validity location (i.e. geographic area where the AMSID applies) with analogous characteristics as validity time described above.

Once an AMSID has been allocated, the AFLSF entity may provide the AMSID and optionally other conditions as listed earlier to the UE using any of the following methods:

via a new container or information element that is optionally transported to the UE via the AMF, where any existing or new NAS procedure may be used for this purpose, via the application layer, where the AMFSID may first provide the AMSID information to the AF, which in turn sends it to the UE via application layer signalling, as part of a registration procedure.

Sending an AMSID to a UE during Registration

A UE which is configured to use FL, or support AI/ML capabilities, should indicate this to a network when the UE registers with the network. This indication may be, for example, a new bit position in the 5GMM capability IE, or may be sent as part of a new information element (IE) in a NAS message such as a Registration Request message. Additionally or alternatively, the UE may indicate that it supports the reception of FL information (which may refer to at least the AMSID or other related information/conditions e.g. such as those described earlier).

The UE may have local policies or other configuration information that recommend/specify when the UE should engage in FL or when the UE should send a request for FL. This may be based on, for example, time of the day, UE location, user interaction or other upper layer requests, reception of new configuration information from the network/AF, etc. For example the UE may be configured with information that indicates when the UE should engage in FL optionally for a particular AMSID, noting that this information may be provided by the network as described further below.

The UE may receive an AMSID (and optionally with other related conditions as listed earlier) in a registration accept message. The UE may save the received information and use it according to the conditions that are provided, if any. For example, use an AMSID with a specific network slice (S-NSSAI) and/or DNN if this information is provided with the AMSID, or may use the AMSID only if a PDU session has been established with the provided S-NSSAI and/or DNN, use the AMSID for a certain validity period if a validity timer is provided, or use the AMSID in a certain location if location information is provided, such that the location information describes the validity of the AMSID (noting that the location information may be in the form of a list of tracking area identity list or any other type of location information), use the AMSID at a specific time or location, or when other conditions are met—where these conditions may be defined accordingly.

Any combination of the above conditions may be verified or enforced by the UE in order to use the AMSID.

For a UE which indicates that it supports or can use FL, the AMF may determine to send an AMSID (which may include other conditions as listed earlier) to a UE. This information may be sent to the UE in any NAS message such as a: registration accept message, or a configuration update command message (e.g. at any time after the UE has registered, optionally when the information needs to be updated for the UE):

based on the indication from the UE, or based on sub-scription information that the UE is allowed to use/perform FL, the AMF may determine to verify whether the UE is allowed to use FL, or to fetch the necessary AMSID for the UE (which may include other conditions as listed earlier), the AMF may contact a network node for this purpose where the network node may be a dedicated node such as the AFLSF entity node.

The AMF may receive an AMSID for a UE (which may include other information or conditions as described earlier) from another network node such as the UDM, PCF, NEF, AFLSF entity, etc. Based on this, the AMF may determine which network slice (S-NSSAI) would be required for the UE so that it can use FL. This this determination may be based on slice information that is present in the AMSID content or other information that the AMF may use to get a set of slices that should be used with the AMSID. For example, the AMF may use some information and provide it to a network slice selection function, or obtain another set of information from another network node, in order to determine at least one S-NSSAI that would correspond to the AMSID. After determining the network slice, the AMF should ensure that the determined S-NSSAI is part of the allowed NSSAI for the UE. In one alternative solution, the AMF only provides an AMSID to the UE if the slice that is required for the FL (corresponding to the AMSID) is allowed for use by the UE e.g. if the slice is part of the UE's allowed NSSAI. The AMF may also have a corresponding validity timer for this AMSID as described earlier for other network nodes—as such the same proposals would apply for the AMF.

Once the necessary AMSID (which may include other information or conditions as listed earlier) has been determined, the AMF may send this information to the UE as part of a registration accept message. The information may include a validity time and/or other conditions.

If the AMSID information changes at any time, e.g. the AMF gets an indication from another network node (as listed above) that the information has been updated, then the AMF may determine a new set of information (as described above) and send updated information to the UE. The updated information may be sent using any NAS message such as a configuration update command, a service accept, a registration accept, etc. Whenever the UE receives new/updated AMSID information, the UE should replace the old information with the new information. As an option the UE only replaces all the information corresponding to the AMSID which is now being received and for which the UE has an existing entry in its local information. At switch off or deregistration, the UE may save this information in its non-volatile memory.

At any point in time, the network may decide to revoke the use of FL by the UE. The AF may indicate this using the NEF framework, and/or the UDM may inform the AMF about this, or the AFLSF entity may be informed by the AMF, and/or the AFLSF entity may inform the AMF or SMF, etc. The AMF/SMF may in turn inform the UE about the revocation to use FL using any new indication and/or NAS message. For example, the AMF may send an empty AMSID content which signifies the need to revoke previous AMSID information, or the AMF may send AMSID information with an operation code to delete the content in the UE which then means that the UE would not have this information and hence cannot use FL. Similarly, when sending valid AMSID information to the UE, the AMF may indicate an operation code such as "create new AMSID", "update existing AMSID", etc, which informs the UE about the actual action that needs to be taken. The UE should process the received action (i.e. operation code) and AMSID accordingly, e.g. if the operation code is to update or create an AMSID, then the UE updates the AMSID or creates a new AMSID respectively and stores/uses this information accordingly.

The AMF may also inform the UE whether AI/ML (and/or FL in particular) is allowed/supported by the network. This may be done as part of any NAS message (e.g. a registration accept message or a configuration update command message, noting that the latter may be used to indicate if the feature is allowed or not or to change the feature being allowed or not). The indication may be part of a new information element (IE) or an existing IE, e.g. the 5GS network feature support IE, where the indication of support of AI/ML (and/or FL in particular) may implicitly considered to be allowed for the UE. As such, the UE may only request to perform FL (optionally with AMSID) if the UE had received an indication from the network that the feature is supported in the network/allowed for the UE. If the network previously indicated that the feature is supported in the network/allowed for the UE and then later indicates otherwise, then the UE should stop the use of FL and may optionally delete any allocated AMSID. If the network now indicates to the UE that the feature is now supported in the network/allowed for the UE (where it was previously indicated otherwise), then the UE may start using FL (or AI/ML). The network may trigger a registration procedure from a UE by using the Configuration Update Command procedure and requesting the UE to register while in connected mode for the purpose of the network updating the UE with the new status of the AI/ML feature as described above. It should be noted that reception of AMSID and other information as proposed herein may be considered as an implicit indication that FL (order to Perform FL Once a UE is provided with an AMSID, the UE may determine to use a specific network slice and/or DNN for the establishment of a PDU session for the purpose of FL, where this information is retrieved from the stored AMSID in the UE. As such, when the UE needs to perform FL, the UE should establish a PDU session with the associated slice and/or DNN. The UE may include the AMSID in any 5GSM message but especially the PDU Session Establishment Request message. Optionally, if a PDU session is already established and the UE needs to request establishment of a QoS flow (or service data flow, or a QoS rule) for FL, then the UE may also include the AMSID in the PDU Session Modification Request message.

In another option, the UE may also include the AMSID in any 5GMM mobility management message, such as a Service Request message or a Control Plane Service Request message. This may be performed by the UE to indicate to the network that the UE is sending the NAS message for FL, e.g. to indicate to the network that the UE is requesting user plane resources for FL. Optionally, a new service type or control plane service type may be defined to indicate that the reason for sending the message is for the UE to use FL. Alternatively a new IE may be used for this purpose i.e. to indicate that the NAS message is sent because the UE wants to engage is FL or wants to request user plane resources for FL.

It is possible that the network rejects the UE3 s request (e.g. any 5GSM message or 5GMM message) which was sent with a particular AMSID. In this case, if the network e.g. determines that the UE is not allowed to use FL at least for the indicated AMSID, then the network should send a NAS reject message and indicate that the UE is not allowed to use FL or to use the AMSID for FL. This may be defined as a new 5GMM or 5GSM cause code. When this is received in the UE, the UE may locally delete the AMSID that is associated with the NAS reject message. For example, the UE knows which AMSID was sent to receive a reject NAS message, or the NAS reject message may also include the AMSID (where the network can also include this information in the reject message to indicate which AMSID is not allowed for the UE). If the AMSID is no longer allowed for use by the UE, then the network may send a NAS message to indicate this to the UE. For example, the SMF may determine that the AMSID is not allowed for the UE, or that the UE is not allowed to use FL for an AMSID. The SMF may get this information from the AMF, or UDM, PCF, or any other node e.g. the AFLSF. The SMF may then release the PDU session for the UE and include a new cause code as described above. Alternatively the SMF may modify the PDU session to delete the QoS flow (or QoS rule) which is being used for FL and which is associated with the AMSID in question.

AMF and AFLSF Entity Behavior when an AMSID is Received from a UE

The AMF may receive an AMSID in any NAS message such as a Registration Request, a (Control Plane) Service Request, a UL NAS TRANSPORT message, etc. The AMF may verify its local information, or contact another network node, e.g. the AFLSF entity, in order to determine whether the UE is allowed to engage in FL that is referred to by the AMSID. The AMF may determine if the request is allowed or not based on the response from the AFLSF entity. A network node, e.g. a AFLSF node, may receive an AMSID from another network node, based on which the AFLSF entity may need to determine whether the UE is allowed to perform FL or not. The AMF may provide other information as well, such as conditions previously described/proposed herein. For example, the current UE location may also be provided.

If the AMF determines that the UE is not allowed to use the AMSID for FL (or to use FL based on the AMSID), e.g. based on local information or based on another entity (such as the AFLSF entity or other network function) indicating that the AMSID is not allowed for the UE, then the AMF should send a NAS reject message with a new 5GMM cause value (as proposed earlier). The NAS message that the AMF sends may be a DL NAS TRANSPORT message which contains a 5GSM message that was not forwarded due to the determination that the UE is not allowed to use FL or to use the AMSID in FL, where the AMF may have determined that this is not allowed for the UE and hence the AMF does not forward the 5GSM message to an SMF.

If the AMF determines that the UE is allowed to use FL as per the AMSID being allowed, and is not invalid, e.g. based on an associated validity timer that has not expired, then the AMF may use the AMSID to select a network slice (e.g. optionally if the UE did not include a slice for the request), or to select an SMF. The AMF may then forward any 5GSM message to the selected SMF (if any is provided by the UE), or the AMF may request the establishment of user plane resources for the UE. The AMF may provide the AMSID to the SMF.

Optionally, if the AMSID is allowed, where optionally the AMSID may be associated with a certain priority level, then the AMF may determine to make further specific exceptions for the UE so that it can perform FL. For example, the AMF may ignore any congestion control mechanism that is being applied, e.g. a back-off timer that is running for the UE, or may allow/process the request although the UE is in a non-allowed area (where the concept of 'non-allowed' area may be related to any mobility management restriction and/or session management restriction e.g. based on service arca restrictions). The AMF may then bypass any current restriction and grant the UE request. This behaviour may be because the request is for FL, or because the AMSID is associated with a certain priority level which requires this exception and the granting of the request.

The AMF may verify other conditions as listed previously in order to determine if the requested FL can be granted, e.g. checks the UE current location versus the location information that is in the FL context which defines the location in which FL is allowed as have been described earlier.

Although the present disclosure presents the behaviour of the AFLSF entity, the same proposal can apply to another network node such as the PCF, UDM, NEF, SMF, AMF, etc. Similarly, the present disclosure assumes that the AFLSF entity receives the AMSID from another network node such as the AMF. However the sending node may be a different function that is not an AMF, e.g. it may be any of SMF, UDM, NEF, etc. As such, the description below should not be taken as a restriction but rather as an example which may apply to other nodes as well.

When the AFLSF entity receives an AMSID from another network node, e.g. the AMF, the AFLSF entity may take any of the following actions, in any order or combination:

the AFLSF entity verifies its local context to determine if the UE is allowed to use the AMSID, where this information may have been previously created/stored as described earlier, e.g. the AF may have sent this information to the AFLSF entity via an NEF, or it may have been sent by the UDM, etc. This may require the AFLSF entity checking a validity timer that is associated with the AMSID or other conditions that were previously described, e.g. whether the AMSID can be used in a certain current location, time, etc. The AFSLF entity may receive the current UE location from the AMF or another entity, e.g. the AFLSF entity may use another NF to determine the UE's location, the AFLSF entity may also determine which slice and/or DNN should be used for the UE and may send this information (e.g. slice and/or DNN), the AFLSF entity may determine if the request, e.g. based on the AMSID, should be prioritized or not and provide this information to the requesting node which may be an AMF or another node as indicated above.

SMF and AFLSF Entity Behavior after Receiving an AMSID from a UE for FL

The SMF may receive an AMSID in any NAS message such as a PDU Session Establishment Request message, a PDU Session Modification Request message etc. The SMF may verify its local information, or by contacting another network node, e.g. the AFLSF entity, in order to determine whether the UE is allowed to engage in FL that is referred to by the AMSID. The SMF may determine if the request is allowed or not based on the response from the AFLSF entity.

A network node, e.g. AFLSF entity node, may receive an AMSID from another network node based on which the AFLSF entity may need to determine whether the UE is allowed to perform FL or not. The SMF may provide other information as well such as those conditions previously described/proposed above, e.g. a current UE location may be provided as well.

If the SMF determines that the UE is not allowed to use the AMSID for FL (or to use FL based on the AMSID), for example based on local information or based on another entity (such as the AFLSF entity or other network function) indicating that the AMSID is not allowed for the UE, then the SMF may send a NAS reject message with a new 5GSM cause value (as proposed earlier). The NAS reject message may be a PDU Session Establishment Reject message or a PDU Session Modification Reject message, etc.

If the SMF determines that the UE is allowed to use FL as per the AMSID being allowed, and is not invalid, for example based on an associated validity timer that has not expired, then the SMF may accept the request and establish a PDU session, or modify a PDU session. The SMF may also create (or modify) a QoS rule (or QoS flow, or service data flow) that conforms with a well-known set of QoS parameters such as a 5QI (or QFI) or other QoS parameters. The QoS parameters to be used may be locally configured in the SMF, e.g. based on the AMSID, or may be received from another network node such as the AFLSF entity node. The SMF may then process/continue with the PDU session establishment or modification with the determined QoS parameters. The SMF may indicate the determined QoS parameters to the UE in a 5GSM response message, e.g. may include them in the form of an authorized QoS rules IE, etc. The SMF may also include other information such as a validity timer which indicates the time that the FL can be used, or the time that the PDU session will be considered valid, etc.

Optionally, if the AMSID is allowed, where optionally the AMSID may be associated with a certain priority level, then the SMF may determine to further make specific exceptions for a UE so that it can perform FL. For example, the SMF may ignore any congestion control mechanism that is being applied (e.g. a back-off timer that is running for the UE), or may allow/process the request although the UE is in a non-allowed area (where the concept of 'non-allowed' area may be related to any mobility management restriction and/or session management restriction e.g. based on service area restrictions). As such the SMF may bypass any current restriction and grant the UE request, where this behaviour may be because the request is for FL, or because the AMSID is associated with a certain priority level which requires this exception and the granting of the request.

The SMF may verify other conditions as listed previously in order to determine if the FL request can be granted, e.g. checks current UE location versus location information that is in the FL context which defines the location in which FL is allowed, as has been described earlier.

Although the solution of the present disclosure presents the behaviour of the AFLSF entity, the same proposal can apply to another network node such as the PCF, UDM, NEF, SMF, AMF, etc. Similarly, the invention assumes that the AFLSF receives the AMSID from another network node such as the SMF, however the sending node may be a different function that is not an SMF, e.g. it may be an AMF, or UDM, NEF, etc. As such, the proposals below should not be taken as a restriction but rather as an example which may apply to other nodes as well.

It is proposed that the AFLSF entity may behave in a similar manner as already described for the case when the AFLSF entity receives an AMSID from an AMF (i.e. using any order or combination of actions that were proposed previously).

Additionally, the AFLSF entity may indicate whether the request (e.g. to establish or modify the session for the purpose of FL) should be granted or not, or whether the UE is allowed to engage in FL (e.g. for the associated AMSID). The AFLSF entity may also indicate the QoS parameters to use for the session and provide that to the SMF.

Exemplary Call Flows

FIG. 6 shows a procedure for enabling FL configuration recommendation by the AFLSF entity.

The procedure for enabling FL operation configuration recommendation by the AFLSF entity in FIG. 6 is described step-by-step below.

601. The application server acting as AF determines to use FL to train a global model to be distributed and used by multiple UEs.

602. The AF requests the AFLSF entity (via NEF if the AF is untrusted for the operator) to provide a configuration recommendation for the FL operation. The FL configuration recommendation request must include the FL aggregation mode (i.e. synchronous, asynchronous, or a combination of both) to be provided by the AFLSF entity. In addition, the recommendation request may also task the AFLSF entity with providing the UEs that should be part of the FL training, if the FL aggregation mode recommendation is followed and their QoS requirements.

In another alternative, the AF may request 5GC assistance for FL operation (via NEF if AF is untrusted for the operator) using the AFLSF entity or NEF new services (e.g. Naflsf-_FL_assistance_request/Nnef_FL_assistance_request or Naflsf_FL_assistance_subscribe/Nnef_FL_assistance_sub-scribe). The request or subscription may optionally indicate FL configuration parameters relevant to the 5GS. These parameters may include a list of UEs or group of UEs for the complete FL operation (i.e. one list for all FL iterations) or per FL iteration, the maximum number of allowed iterations, time window for model aggregation, QoS requirements, AMSID, target area(s), time validity, number of awaited models before global model update, UE continuous training flag.

603. The AFLSF entity subscribes to or requests NWDAF analytics to get assistance on the determination of the FL configuration recommendation. Those analytics include but may not be restricted to UE communication analytics and DN performance analytics. These provide statistics and/or predictions on user plane traffic that may help profiling UEs by the AFLSF and determine if and how they can be part of the FL group.

604. The AFLSF entity may consume the event exposure service Nsmf_EventExposure from an SMF to collect available information relevant to the UE and the user plane status, which may help profiling UEs by the AFLSF entity and determine if and how they can be part of the FL group. Hence, the AFLSF entity may subscribe to user plane status information event, UE communications trends event, UE session behaviour trends event. The AFLSF entity may also subscribe to the QoS monitoring report event, which should be made available in the context of AI/ML-based services in addition to the previously supported URLLC.

605. The AFLSF entity may consume the event exposure service Namf_EventExposure from an AMF to collect available information relevant to the UE, which may help profiling UEs by the AFLSF and determine if and how they can be part of the FL group. Hence, the AFLSF entity may subscribe to UE location trends event, UE moving in or out of area of interest event, UE loss of communication event, UE reachability status event.

606. The AFLSF entity derives the FL configuration recommendation including the FL aggregation mode and optionally including the recommended UEs for each FL aggregation mode and their QoS requirements. The AFLSF may also derive an AMSID, as previously described, if it does not have a suitable one.

In another alternative, based on the collected inputs, the AFLSF derives a FL configuration recommendation based on the assistance request from the AF in step 2. The AFLSF may also derive an AMSID according to clause 6.40.1.2 if it does not yet have a suitable AMSID. The AMSID is associated with the UEs which have been recommended for FL operation.

607. A response is provided by the AFLSF entity to the AF with a recommendation for the FL configuration containing the FL aggregation mode and optionally a list of recommended UEs for the FL operation along with their QoS requirements. The AMSID may also be included. The AF may confirm whether the AFLSF entity recommendation has been accepted.

In another alternative, a response is provided by the AFLSF notify service operation (e.g. Naflsf_FL_assistance_notify) to the AF via NEF if needed, with a notification indicating the FL configuration parameters suggested by the AFLSF. The notification may contain some or all of the parameters mentioned in step 2 and described in clause 6.40.1.1. The AF may confirm whether the AFLSF recommendation has been accepted.

608. AF requests the network to provide group QoS for a list of UEs as described.

609. The application FL operation takes place between the application server at the AF and the UE.

An exemplary procedure for a UE-initiated request to join an FL AI/ML session without SMF involvement is shown in FIG. 7 and is described step-by-step below.

701. An AMSID is allocated to the UE as described above.

702. The UE decides to request to join an AI/ML session for FL.

703. The UE sends a NAS message including the AMSID to the AMF indicating the request to use FL. The AMF may receive an AMSID in any NAS message such as any of Registration Request, (Control Plane) Service Request, UL NAS TRANSPORT message, etc.

704. The AMF verifies the UE subscription information and determines whether the UE can use AI/ML from subscription information or from the actual request from the UE to use FL.

705. The AMF requests authorization from the AFLSF entity for the AMSID to be used by the UE.

706. When the AFLSF entity receives an AMSID from the AMF, the AFLSF verifies if the AMSID can be used by the UE by taking any of the following actions, in any order or combination:

the AFLSF entity may verify its local context to determine if the UE is allowed to use the AMSID, which may require the AFLSF entity checking whether the AMSID can be used in a certain current location, time, etc., based on previous interactions of the AFLSF entity with the AF, the AFLSF entity may also determine which network slice and/or DNN should be used for the UE and the AFLSF entity may send this information back to the AMF (e.g. slice and/or DNN), the AFLSF entity may determine if the request, e.g. based on the AMSID, should be prioritized or not.

707. The AFLSF entity may provide an updated recommendation to the AF to include the UE into the FL group indicating the AMSID, and the AF may confirm if the recommendation is accepted.

708. The AFLSF entity provides a response to the AMF indicating whether the UE request to join the FL group is authorized. If the request is authorized, the response may include one or multiple AMSID(s) and additional information.

709. The AMF processes the information received by the AFLSF entity and may check other conditions in order to determine if the UE request can be granted. If the AMF determines that the UE is allowed to use FL as per the AMSID being allowed, and is not invalid, then the AMF may use the AMSID to select a network slice (optionally if the UE did not include a slice for the request), or to select an SMF. The AMF may then forward any 5GSM message to the selected SMF (if any is provided by the UE), or the AMF may request the establishment of user plane resources for the UE. The AMF may provide the AMSID to the SMF. If the AMF determines that the UE is not allowed to use the AMSID for FL e.g. based on local information or based on the AFLSF entity notification indicating that the AMSID is not allowed for the UE.

710. The AMF notifies the UE of the decision via a NAS message. If the request is granted, a Registration Accept message may be provided indicating the accepted AMSID and additional information. The message may also include an allowed NSSAI such that at least one S-NSSAI corresponds to the AMSID. If the request is not granted, the AMF may send a NAS reject message with e.g. a new 5GMM cause value. The NAS message that the AMF sends may be a DL NAS TRANSPORT message which may contain a 5GSM message that was not forwarded due to the determination that the UE is not allowed to use FL or to use the AMSID, where the AMF may have determined that this is not allowed for the UE and hence the AMF does not forward the 5GSM message to an SMF.

An exemplary procedure for a UE-initiated request to join an FL AIML session is shown in FIG. 8 and is described step-by-step below.

801. An AMSID is allocated to the UE according to the description above.

802. The UE decides to request to join an AI/ML session for FL. The decision is made by the application, thus it is out of 3GPP scope.

803. The UE sends a PDU session establishment or PDU session modification message including the AMSID towards the SMF indicating the request to use FL.

804. The SMF sends a validation request to the AFLSF entity for the AMSID to be used by the UE in order to determine whether the UE is allowed to engage in FL using the AMSID.

805. When the AFLSF entity receives an AMSID from the SMF, the AFLSF entity validates if the AMSID can be used for the UE:

The AFLSF entity may indicate whether the request should be granted or not. The AFLSF entity may also indicate the QoS parameters to use for the session and provide that to the SMF.

The above may require the AFLSF entity checking whether the AMSID can be used based on previous interactions of the AFLSF entity with the AF.

806. The AFLSF entity may provide an updated recommendation to the AF to select the UE for the FL operation indicating the AMSID, and the AF may confirm if the recommendation is accepted.

807. The AFLSF entity provides a validation response to the SMF indicating whether the UE request to join the FL operation using the AMSID is authorized. If the request is authorized, the validation response may include one or multiple AMSID(s), required QoS, etc.

808. If the SMF determines that the UE is allowed to use FL as per the AMSID being allowed, then the SMF may accept the PDU session establishment/modification with the QoS that is indicated by the AFLSF.

809. The UE starts the FL process after the establishment of the user plane resources.

FIGS. 9 and 10 show exemplary procedures for a UE-initiated request to join a FL AI/ML session. In particular, FIG. 9 shows a call flow for an AMF sending an AMSID to a UE and FIG. 10 shows a call flow for an AMSID sent to a SMF.

The procedure shown in FIG. 9 is described step-by-step below.

901. The UE is configured to indicate support or need to use the AI/ML (or the FL)

902. The UE sends, to the AMF, a 5GMM message (e.g. Registration request), indicating need to use/support of the AI/ML or the FL/

903. The AMF verifies subscription information. The AMF determines that the UE can use AI/ML from subscription information or from UE request/support for the AI/ML (or FL). The AMF contacts the AFSLF to get an AMSID. The AMF may also contact other nodes to get slice for the FL.

904. The AMF transmits, to the AFSLF, a request (authorization) for the AMSID for the UE in question. The AMF may request slice or other information.

905. The AFSFL verifies subscription information to determine if the UE can use the AI/ML (or FL). The AFSFL may verify if the AFSLF contains FL context e.g. based on previous interaction with the AF, where a set of AMSID may be saved for the UE optionally with other conditions (e.g. UE location, etc.)

906. The AFSFL transmits, to the AMF, a response (authorization response) for the FL. If accepted the response may include a set of AMSID and/or other conditions as explained earlier.

907. The AMF transmits, to the UE, a registration accept including AMSID and/or other information as described earlier. Actual information may be sent as part of a new IE or container that optionally transparent to the AMF. The registration accept may also include an allowed network slice selection assistance information (NSSAI) such that at least one single-NSSAI (S-NSSAI) corresponds to an AMSID or is for an AI/ML or FL session. The network may further explicitly/implicitly indicate AI/ML is allowed for the UE.

908. The UE stores the received AMSID and/or other information. The UE may use this information for AI/ML (or FL as described.

The procedure shown in FIG. 10 is described step-by-step below.

1001. The UE has an AMSID which is allocated as previously explained. The UE determines to use the FL.

1002. The UE sends a 5GSM message with the AMSID. 5GSM is sent in a 5GMM message which may also contain the AMSID.

1003. The AMF may verify if the request to use the FL by the UE can be granted, e.g. can be forwarded to an SMF. The AMF may select the SMF based on the AMSID or determined slice ID.

1004. The AMF forwards 5GSM message and optionally indicates the AMSID, current UE location, etc to the SMF. The AMF may bypass certain restrictions as previously explained.

1005. The SMF transmit, to the AFSLF, request of authorization for the FL based on the AMSID. The request may include current UE location and/or other information as previously explained.

1006. The AFSLF verifies if the FL is allowed for the UE based on the AMSID and optionally verifying other conditions. The other conditions may comprise at least one of current UE location, time, AMSID validity, etc.

1007. The AFSLF transmits authorization response for the FL to the SMF. If accepted, the authorization response for the FL may include required QoS to be used for the session/flow.

1008. If the request is deemed acceptable, the SMF establish/modify a session with a determined QoS parameters (e.g. as received from the AFSLF).

1009. The AMF transmit, to the UE, a 5GSM response. The 5GSM response optionally include the AMSID and the determined QoS parameters.

FIG. 11 shows a call flow of an exemplary procedure for enabling FL configuration recommendation (i.e. UE selection recommendation) by the NF hosting the AFLSF entity.

1001. The AF may subscribe to, or request, 5GC recommendation for UE selection for application AI/ML operation (i.e. FL operation) from the NF hosting the AFLSF entity, e.g. NEF, using any suitable services, for example one or more of the services described in the present disclosure.

The AF may provide, in/with the request, a list of UEs or group of UEs (optionally per iteration), and event filters (e.g. maximum number of learning iterations, model aggregation time window, QoS requirements, AMSID, number of awaited models, continuous training flag, target area(s), operation time validity, target UE latency performance, expected UE behaviour parameters).

1002. In order to provide the requested recommendation, the NF hosting the AFLSF entity, e.g. NEF, may subscribe to events with the AMF, SMF, other 5GC NF and/or NWDAF for data and/or analytics collection, as shown in sub-operations 1002a, 1002b, 1002c, 1002d, 1002e, 1002g, 1002h, and 1002i. For example, the NF hosting the AFLSF entity may transmit a message to one or more of the AMF, SMF, UPF, to collect data, where the message may request the data or subscribe to receive the data. It will be appreciated that the NWDAF may subscribe only to the entities which it needs to collect data/information from as described in 3GPP TS 23.288.

1003. The NF hosting the AFLSF entity derives the UE selection recommendation for the AF based on the collected input from the rest of 5GC NFs and its internal logic.

1004. The NF hosting the AFLSF entity provides the recommendation response for application AI/ML operation to the AF. The response may include the recommended list of UEs or group of UEs (optionally per iteration), maximum number of learning iterations, model aggregation time window, QoS requirements, AMSID, number of awaited models, continuous training flag, target area(s), operation time validity, UE latency performance.

FIG. 12 shows a block diagram of an apparatus for an entity.

The apparatus 1200 may be one of the plurality of entities described herein, for example the UE, the PCF, the AMF, the SMF, the AFLSF, the NWDAF, the NEF, the AF.

The apparatus may comprise a memory 1210, a transceiver 1220, and a controller 1230.

The memory 1210 may store at least one of information transmitted/received via the transceiver 1220 and information generated via the controller 1230. The memory may further store information/data/commands/instructions to be executed by the controller 1230 to cause the apparatus 1200 to perform operations described herein. The memory 1210 may be referred to as a non-transitory computer readable storage medium.

The transceiver 1220 may be used for transmitting signals from the controller 1230 to other entities or receiving signals from other entities. The transceiver may support communication through various radio access technologies (RATs) including, for example but not limited to, Long Term Evolution (LTE), Wireless Fidelity (Wi-Fi), orthogonal frequency division multiplexing (OFDM), code divisional multiple access (CDMA), and Bluetooth.

The controller 1230 may control operations of other elements of the apparatus 1200. The operations of the apparatus may be understood as being substantially performed by the controller 1230. The controller 1230 may be implemented through at least one processor. The controller 1230 may execute the instructions stored in the memory 1210 to perform operations of the apparatus 1210 described herein.

An exemplary further aspect of the disclosure may provide, in a communication network comprising a 5G core (5GC) and a plurality of user equipments (UEs), an entity of the network provided by the 5GC that enables at least some of the UEs to engage in artificial intelligence/machine learning (AI/ML) operation via any of a synchronous mode, an asynchronous mode, an intermediate mode.

The entity enabling at least some of the UEs to engage in an AI/ML operation in a synchronous mode may comprise the entity enabling at least some of the UEs to engage in an AI/ML operation in a synchronous mode of model aggregation where an application server of the network waits for all local model updates before model aggregation.

The entity enabling at least some of the UEs to engage in an AI/ML operation in an asynchronous mode may comprise the entity enabling at least some of the UEs to engage in an AI/ML operation in an asynchronous mode of model aggregation where an application server of the network does not wait for any specific individual model before model aggregation. The application server may aggregate models and provide a global model update as soon as a new model update arrives.

The entity enabling at least some of the UEs to engage in an AI/ML operation in an intermediate mode may comprise the entity enabling at least some of the UEs to engage in an AI/ML operation in an intermediate mode of model aggregation where an application server of the network waits for a selected group of UEs sharing a set of local models or model updates before model aggregation. The application server does not wait for other UEs sharing their models/model updates before model aggregation.

The entity may further enable at least some of the UEs to request joining of an existing AI/ML operation. Enabling at least some of the UEs to request joining of an existing AI/ML operation may be used as part of an asynchronous mode of model aggregation where the UEs decide when to provide model updates and the network authorizes it.

The entity may be an Application Federated Learning Support Function (AFLSF) entity. The AFLSF entity may be any of a standalone entity, an entity co-located with another 5GC entity, or an entity in an AF. The AI/ML operation may comprise a FL operation.

An exemplary further aspect of the disclosure may provide, in a communication network comprising a 5G core (5GC), and application function (AF) and a plurality of user equipments (UEs), an entity of the network which is at least partially responsible for allocation of an artificial intelligence/machine learning (AI/ML) session identity (AMSID) for participation in an AI/ML operation to at least some of the UEs.

The entity being at least partially responsible for allocation of an AMSID to at least some of the UEs may comprise:

the AF of the network communicating with the 5GC of the network to indicate one or more UEs which should be allocated an AMSID, and the AF indicating the one or more UEs to be allocated an AMSID to the entity.

The AF may indicate the one or more UEs to be allocated an AMSID to the entity via another network node, such as any of PCF, NEF, UDM, AMF, SMF.

The AF of the network may provide an application layer AMSID. This AMSID may be generated and allocated by an application layer or the AF for a UE.

The AF of the network may provide one or more conditions that need to be met before a UE allocated an AMSID can participate in an AI/ML operation.

The one or more conditions may comprise a location of an UE where AI/ML operation participation is allowed.

The one or more conditions may comprise a network slice and/or DNN that should be used with a UE AMSID for AI/ML operation participation.

The one or more conditions may comprise a time of any of a day, year, month at which a UE can connect for AI/ML operation participation.

The one or more conditions may comprise a duration and frequency of AI/ML operation participation. The duration and frequency of AI/ML operation participation may comprise a UE connecting to the operation at a certain time T and continuing participation for X units.

The one or more conditions may comprise an indication of when a UE may or may not re-join an ongoing AI/ML operation after the UE does not provide a model update during an AI/ML operation iteration.

The one or more conditions may comprise whether a number of UEs need to be available at any of a same time, a different time for AI/ML operation participation. The UEs may be, for example, any of specific UEs, UEs that can perform AI/ML operation participation, UEs that share a requirement such as, for example, any of a common AMSID, use of the same application.

The one or more conditions may comprise subscription information determining UE AI/ML operation participation and whether it may do so for one group only, or more than one group at any time. New subscription information may be defined for this purpose.

It will be appreciated that the one or more conditions described above may be used in any combination and that other conditions may also be defined.

A UE may have local policies or other configuration information that specify UE AI/ML operation participation. A UE may have local policies or other configuration information that specify when a UE should initiate a request for AI/ML operation participation. This may be based on, for example, time of day, UE location, user interaction or other upper layer requests, reception of new configuration information from the network/AF. For example, a UE may be configured with information that indicates when the UE should participate in an AI/ML operation for a particular AMSID.

A UE may receive information including an AMSID in a registration accept message. The UE may save the received information. The UE may use the information according to any conditions that are provided.

The UE may use the AMSID with a specific network slice (S-NSSAI) and/or DNN if this information is provided with the AMSID. The UE may use the AMSID if a PDU session has been established with the provided S-NSSAI and/or DNN. The UE may use the AMSID for a certain validity period if a validity timer is provided. The UE may use the AMSID in a certain location if location information is provided such that the location information describes the validity of the AMSID. The location information may be in the form of a list of tracking area identity or any other type of location information. The UE may use the AMSID at a specific time or location.

The entity may be an Application Federated Learning Support Function (AFLSF) entity. The AFLSF entity may be any of a standalone entity, an entity co-located with another 5GC entity, or an entity in an AF. The AI/ML operation may comprise a FL operation.

An exemplary further aspect of the disclosure may provide, in a communication network comprising a 5G core (5GC) an application function (AF) and a plurality of user equipments (UEs), a procedure for a UE-initiated request to join an AI/ML session using an entity of the network, the procedure comprising:

an AMSID being allocated to the UE, the UE deciding to request to join the AI/ML session, the UE sending a PDU session establishment or PDU session modification message including the AMSID towards an SMF of the network indicating the request to join the AI/ML session, the SMF sending a validation request to the entity for the AMSID to be used by the UE in order to determine whether the UE is allowed to join the AI/ML session using the AMSID, when the entity receives the AMSID from the SMF, the entity validating if the AMSID can be used for the UE, the entity providing an updated recommendation to the AF of the network to select the UE for the AI/ML session indicating the AMSID and the AF confirming if the recommendation is accepted, the entity providing a validation response to the SMF indicating whether the UE request to join the AI/ML session using the AMSID is authorized, if the SMF determines that the UE is allowed to the AI/ML session as per the AMSID being allowed, the SMF accepting the PDU session establishment/modification with a QoS that is indicated by the entity, the UE starting the AI/ML session after the establishment of user plane resources.

When the AFLSF entity receives an AMSID from the SMF, the AFLSF entity

In validating if the AMSID can be used for the UE, the entity may indicate whether the request should be granted or not. The entity may also indicate QoS parameters to use for the session and provide these to the SMF. Validating if the AMSID can be used for the UE, may require the entity checking whether the AMSID can be used based on previous interactions of the entity with the AF.

the entity providing a validation response to the SMF indicating whether the UE request to join the AI/ML session using the AMSID is authorized, If the UE request to join the AI/ML session using the AMSID is authorized, the validation response from the entity may include one or multiple AMSID(s), required QoS.

The entity may be an Application Federated Learning Support Function (AFLSF) entity. The AFLSF entity may be any of a standalone entity, an entity co-located with another 5GC entity, or an entity in an AF. The AI/ML operation may comprise a FL operation.

The skilled person will appreciate that the present disclosure is not limited to the The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure provide a network or wireless communication system comprising a first network entity and a second network entity according to any example, embodiment, aspect and/or claim disclosed herein.

Certain examples of the present disclosure provide a computer program comprising instructions which, when the program is executed by a computer or processor, cause the computer or processor to carry out a method according to any example, embodiment, aspect and/or claim disclosed herein.

Certain examples of the present disclosure provide a computer or processor-readable data carrier having stored thereon a computer program according to the preceding examples.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g. a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

While the invention has been shown and described with reference to certain examples, it will be understood by those skilled in the art that various changes in form and detail may be made therein without departing from the scope of the invention, as defined by the appended claims.

The invention claimed is:

1. A method for supporting federated learning (FL) by an application federated learning support function (AFLSF) in a wireless communication system, the method comprising:
   receiving, from an application function (AF), a message for requesting assistance for an FL operation;
   obtaining, from a network data analytics function (NWDAF), analytics to get assistance on determination of an FL configuration recommendation;
   obtaining information related to at least one user equipment (UE) from a session management function (SMF) and an access and mobility management function (AMF);
   deriving a FL configuration recommendation based on the analytics and the obtained information related to the at least one UE;
   transmitting, to the AF, a response message including at least one parameter related to the FL configuration recommendation; and
   providing an updated recommendation to the AF to select a UE for the FL operation, based on a validation request message for an artificial intelligence/machine learning (AI/ML) session identifier (AMSID) from the SMF.

2. The method of claim 1, wherein the message for requesting the assistance for the FL operation comprises at least one of:
   a list or group of UEs participating in the FL operation;
   a maximum number of learning iterations related to model exchanges between UEs and an application server;
   a time window for model aggregation indicating maximum time that the application server can wait to receive local models from UEs to provide an update of a global model;
   a minimum number of awaited models indicating number of local UE models which the application server requires to receive within the time window for the model aggregation to provide the update of the global model;
   continuous training flag indicating whether UEs are allowed to continue performing training once the UEs have shared a local model and before the UE receive the update of the global model;
   quality of service (QoS) requirements requested by the AF for the FL operation;
   the AMSID to be used for the FL operation;
   at least one target areas where UEs should be located to be selected for the FL operation; and
   operation time validity indicating time during which the FL operation may be performed.

3. The method of claim 1, wherein obtaining the information related to the at least one UE from the SMF and the AMF comprise consuming an event exposure service from the SMF and the AMF to obtain the information related to the at least one UE.

4. The method of claim 3, further comprising:
   obtaining a user plane status from the SMF by consuming the event exposure service from the SMF,
   wherein the FL configuration recommendation is derived further based on the user plane status.

5. The method of claim 1, wherein the response message comprises at least one of:
   a list or group of UEs participating in the FL operation;

a maximum number of learning iterations related to model exchanges between UEs and an application server;

a time window for model aggregation indicating maximum time that the application server can wait to receive local models from UEs to provide an update of a global model;

a minimum number of awaited models indicating number of local UE models which the application server requires to receive within the time window for the model aggregation to provide the update of the global model;

continuous training flag indicating whether UEs are allowed to continue performing training once the UEs have shared a local model and before the UE receive the update of the global model;

quality of service (QoS) requirements requested by the AF for the FL operation;

the AMSID to be used for the FL operation;

at least one target areas where UEs should be located to be selected for the FL operation; and operation time validity indicating time during which the FL operation may be performed.

6. The method of claim 1, further comprising:

receiving, from the AF, information indicating the UE to which the AMSID should be provided, and information indicating conditions that need to be met before the UE is allowed to engage in the FL; and allocating the AMSID to the UE based on determining that the conditions are met before the UE is allowed to engage in the FL.

7. The method of claim 6, wherein the conditions that need to be met before the UE is allowed to engage in the FL comprises at least one of:

a location of the UE where the FL is allowed;

time of a day at which the UE connect to be part of a FL procedure;

duration and frequency of the FL operation; and whether a certain number of UEs need to be available at a same time.

8. The method of claim 6, further comprising:

receiving, from the SMF, the validation request message for the AMSID to be used by the UE to request to use the FL based on the SMF receiving a session management message including the AMSID;

validating whether the AMSID can be used for the UE; and transmitting, to the SMF, a validation response message indicating that the UE is authorized to join the FL operation using the AMSID.

9. The method of claim 8, wherein validating whether the AMSID can be used for the UE is based on previous interactions of the AFLSF with the AF.

10. The method of claim 8, wherein the validation response message comprises the AMSID and required QoS for the FL operation.

11. An apparatus of an application federated learning support function (AFLSF) for supporting federated learning (FL) in a wireless communication system, the apparatus comprising:

a transceiver; and a controller coupled to the transceiver, wherein the controller is configured to:

receive, from an application function (AF), a message for requesting assistance for an FL operation;

obtain, from a network data analytics function (NWDAF), analytics to get assistance on determination of an FL configuration recommendation;

obtain information related to at least one user equipment (UE) from a session management function (SMF) and an access and mobility management function (AMF);

derive a FL configuration recommendation based on the analytics and the obtained information related to the at least one UE;

transmit, to the AF, a response message including at least one parameter related to the FL configuration recommendation; and provide an updated recommendation to the AF to select a UE for the FL operation, based on a validation request message for an artificial intelligence/machine learning (AI/ML) session identifier (AMSID) from the SMF.

12. The apparatus of claim 11, wherein the message for requesting the assistance for the FL operation comprises at least one of:

a list or group of UEs participating in the FL operation;

a maximum number of learning iterations related to model exchanges between UEs and an application server;

a time window for model aggregation indicating maximum time that the application server can wait to receive local models from UEs to provide an update of a global model;

a minimum number of awaited models indicating number of local UE models which the application server requires to receive within the time window for the model aggregation to provide the update of the global model;

continuous training flag indicating whether UEs are allowed to continue performing training once the UEs have shared a local model and before the UE receive the update of the global model;

quality of service (QoS) requirements requested by the AF for the FL operation;

the AMSID to be used for the FL operation;

at least one target areas where UEs should be located to be selected for the FL operation; and operation time validity indicating time during which the FL operation may be performed.

13. The apparatus of claim 11, wherein for obtaining the information related to the at least one UE from the SMF and the AMF, the controller is configured to consume an event exposure service from the SMF and the AMF to obtain the information related to the at least one UE.

14. The apparatus of claim 11, wherein the response message comprises at least one of:

a list or group of UEs participating in the FL operation;

a maximum number of learning iterations related to model exchanges between UEs and an application server;

a time window for model aggregation indicating maximum time that the application server can wait to receive local models from UEs to provide an update of a global model;

a minimum number of awaited models indicating number of local UE models which the application server requires to receive within the time window for the model aggregation to provide the update of the global model;

continuous training flag indicating whether UEs are allowed to continue performing training once the UEs have shared a local model and before the UE receive the update of the global model;

quality of service (QoS) requirements requested by the AF for the FL operation;

the AMSID to be used for the FL operation;

at least one target areas where UEs should be located to be selected for the FL operation; and operation time validity indicating time during which the FL operation may be performed.

15. The apparatus of claim 11, wherein the controller is further configured to:

receive, from the AF, information indicating the UE to which the AMSID should be provided, and information indicating conditions that need to be met before the UE is allowed to engage in the FL; and allocate the AMSID to the UE based on determining that the conditions are met before the UE is allowed to engage in the FL.

16. The apparatus of claim 15, wherein the controller is further configured to:

receive, from the SMF, the validation request message for the AMSID to be used by the UE to request to use the FL based on the SMF receiving a session management message including the AMSID;

validate whether the AMSID can be used for the UE; and transmit, to the SMF, a validation response message indicating that the UE is authorized to join the FL operation using the AMSID.

17. The apparatus of claim 16, wherein the controller is configured to validate whether the AMSID can be used for the UE based on previous interactions of the AFLSF with the AF.

18. The apparatus of claim 16, wherein the validation response message comprises the AMSID and required QoS for the FL operation.

19. A non-transitory computer readable storage medium storing instructions, which, executed by a controller of an apparatus of an application federated learning support function (AFLSF), causes the apparatus to perform operations, the operations comprising:

receiving, from an application function (AF), a message for requesting assistance for an FL operation;

obtaining, from a network data analytics function (NWDAF), analytics to get assistance on determination of an FL configuration recommendation;

obtaining information related to at least one user equipment (UE) from a session management function (SMF) and an access and mobility management function (AMF);

deriving a FL configuration recommendation based on the analytics and the obtained information related to the at least one UE;

transmitting, to the AF, a response message including at least one parameter related to the FL configuration recommendation; and providing an updated recommendation to the AF to select a UE for the FL operation, based on a validation request message for an artificial intelligence/machine learning (AI/ML) session identifier (AMSID) from the SMF.

20. The non-transitory computer readable storage medium of claim 19, wherein the message for requesting the assistance for the FL operation comprises at least one of:

a list or group of UEs participating in the FL operation;

a maximum number of learning iterations related to model exchanges between UEs and an application server;

a time window for model aggregation indicating maximum time that the application server can wait to receive local models from UEs to provide an update of a global model;

a minimum number of awaited models indicating number of local UE models which the application server requires to receive within the time window for the model aggregation to provide the update of the global model;

continuous training flag indicating whether UEs are allowed to continue performing training once the UEs have shared a local model and before the UE receive the update of the global model;

quality of service (QoS) requirements requested by the AF for the FL operation;

the AMSID to be used for the FL operation;

at least one target areas where UEs should be located to be selected for the FL operation; and operation time validity indicating time during which the FL operation may be performed.

* * * * *